United States Patent
Chen

(10) Patent No.: US 8,369,198 B2
(45) Date of Patent: Feb. 5, 2013

(54) SYSTEM AND METHOD FOR PRINTING VISIBLE IMAGE ONTO OPTICAL DISC THROUGH TUNING DRIVING SIGNAL OF OPTICAL PICK-UP UNIT

(75) Inventor: Hong-Ching Chen, Kao-Hsiung Hsien (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 1372 days.

(21) Appl. No.: 12/025,778

(22) Filed: Feb. 5, 2008

(65) Prior Publication Data

US 2009/0196131 A1    Aug. 6, 2009

(51) Int. Cl.
G11B 11/00    (2006.01)
(52) U.S. Cl. .................... 369/53.3; 369/53.43
(58) Field of Classification Search .......... None
See application file for complete search history.

(56) References Cited

U.S. PATENT DOCUMENTS

| | | | |
|---|---|---|---|
| 6,020,977 A * | 2/2000 | Kim ............... | 358/1.7 |
| 2003/0108708 A1 | 6/2003 | Anderson | |
| 2003/0142199 A1 | 7/2003 | McFarland | |
| 2003/0161224 A1 | 8/2003 | Anderson | |
| 2003/0179674 A1 | 9/2003 | Anderson | |
| 2003/0179679 A1 | 9/2003 | Morishima | |
| 2003/0193864 A1 | 10/2003 | Pate | |
| 2003/0194214 A1 | 10/2003 | Anderson | |
| 2003/0231561 A1 | 12/2003 | Morishima | |
| 2004/0001409 A1 | 1/2004 | Morishima | |
| 2004/0001411 A1 | 1/2004 | Morishima | |
| 2004/0001413 A1 | 1/2004 | Suyama | |
| 2004/0008593 A1 | 1/2004 | Osakabe | |
| 2004/0037176 A1 | 2/2004 | Morishima | |
| 2004/0057356 A1 | 3/2004 | Morishima | |
| 2004/0062179 A1 | 4/2004 | Tsurumi | |
| 2004/0071454 A1 | 4/2004 | Nishizawa | |
| 2004/0095866 A1 | 5/2004 | Morishima | |
| 2004/0108071 A1 | 6/2004 | Wien | |
| 2004/0114500 A1 | 6/2004 | McClellan | |
| 2004/0136291 A1 | 7/2004 | Hayashi | |
| 2004/0141045 A1 | 7/2004 | Hanks | |
| 2004/0141385 A1 | 7/2004 | Pettigrew | |
| 2004/0147399 A1 | 7/2004 | Gore | |
| 2004/0160510 A1 | 8/2004 | McClellan | |
| 2004/0212670 A1 | 10/2004 | McClellan | |
| 2004/0224041 A1 | 11/2004 | Morishima | |
| 2005/0013964 A1 | 1/2005 | Van Brocklin | |
| 2005/0018575 A1 | 1/2005 | Nakajyo | |
| 2005/0019522 A1 | 1/2005 | McClellan | |
| 2005/0036767 A1 | 2/2005 | Morishima | |
| 2005/0041092 A1 | 2/2005 | Kwasny | |
| 2005/0046692 A1 | 3/2005 | Bronson | |
| 2005/0056085 A1 | 3/2005 | Liebert | |

(Continued)

FOREIGN PATENT DOCUMENTS

WO    WO2007011059 A1 *    1/2007
WO    WO2007037511 A1 *    4/2007

*Primary Examiner* — Paul Huber
(74) *Attorney, Agent, or Firm* — Winston Hsu; Scott Margo

(57) ABSTRACT

A system and method for printing a visible image onto an optical disc through tuning a driving signal of an optical pick-up unit are disclosed. The system includes a driving circuit, coupled to the optical pick-up unit, for providing a driving signal to drive the optical pick-up unit; and an adjusting circuit, coupled to the driving circuit, for controlling the driving circuit to adjust the driving signal according to a rotation source signal corresponding to a rotation of the optical disc.

40 Claims, 24 Drawing Sheets

U.S. PATENT DOCUMENTS

| | | |
|---|---|---|
| 2005/0057639 A1 | 3/2005 | Van Brocklin |
| 2005/0058042 A1 | 3/2005 | Hanks |
| 2005/0078324 A1 | 4/2005 | Koll |
| 2005/0121416 A1 | 6/2005 | Morishima |
| 2005/0169115 A1 | 8/2005 | Nagano |
| 2005/0180306 A1 | 8/2005 | Valley |
| 2005/0281149 A1 | 12/2005 | Honda |
| 2005/0281152 A1 | 12/2005 | Honda |
| 2005/0281181 A1 | 12/2005 | Honda |
| 2005/0281182 A1 | 12/2005 | Honda |
| 2005/0281183 A1 | 12/2005 | Honda |
| 2006/0017793 A1 | 1/2006 | Koll |
| 2006/0028940 A1 | 2/2006 | Morishima |
| 2006/0066714 A1 | 3/2006 | Hayashi |
| 2006/0092792 A1 | 5/2006 | Hanks |
| 2006/0092793 A1 | 5/2006 | Hanks |
| 2006/0126474 A1 | 6/2006 | Hanks |

* cited by examiner (a)

Blurred edge    (b)    Blurred edge

SYSTEM AND METHOD FOR PRINTING VISIBLE IMAGE ONTO OPTICAL DISC THROUGH TUNING DRIVING SIGNAL OF OPTICAL PICK-UP UNIT

BACKGROUND

The invention relates to a system and method for recording data onto an optical disc, and more particularly, to a system and method for printing a visible image onto an optical disc through tuning a driving signal of an optical pick-up unit.

In addition to recording normal user data, optical disc recording systems are developed to be able to form visible images on the optical disc. Many conventional optical disc recording systems have been developed to carry out the visible image printing. Please refer to FIG. 1. FIG. 1 is a first optical disc recording system 100 according to the related art. The optical disc recording system 100 is configured to print a visible image onto an optical disc 101, such as a CD-R, CD-RW, DVD-R, DVD+RW, DVD-RW, DVD-RAM or other recordable discs. The optical disc recording system 100 comprises an optical pick-up unit (OPU) 102, a spindle motor 104, a spindle controller 106, a draw data generator 108, and a laser driver 110. The draw data generator 108 is used for converting image data received from a host (not shown) into draw data and then outputting the draw data to the laser driver 110. Next, the laser driver 110 is operative to convert the incoming draw data into a driving signal used for driving the OPU 102. In other words, the laser driver 110 drives the OPU 102 in response to the draw data such that a laser beam is emitted at specific irradiation timing and a specific laser power level. Thus, the laser beam emitted from the OPU 102 is applied to the optical disc 101, thereby recording corresponding image data and forming a visible image thereon.

As shown in FIG. 1, the spindle motor 104 is controlled by the spindle controller 106 to rotate the optical disc 101. In this conventional optical disc recording system 100, the spindle controller 106 refers to a frequency generator (FG) signal FG_A, generated due to rotations of the spindle motor 104, to control the spindle motor 104 to rotate the optical disc 101 at a fixed rotation speed. In this way, the desired image is printed onto the optical disc 101 at a fixed printing speed accordingly.

However, it is difficult to make the optical disc 101 steadily rotate at a fixed rotation speed due to the characteristics of the spindle motor 104, such as the slow response of the spindle motor 104, or the imperfect characteristics of the loaded optical disc 101, such as the disc eccentric.

Because the mechanical adjustment applied to the spindle motor 104 is time-consuming, if an abrupt shock occurs, the spindle controller 106 becomes unable to control the spindle motor 104 to stabilize the rotation of the optical disc 101 in time. This unexpected disturbance will degrade the visible image quality. In other words, if random vibration occurs due to unideal characteristics of the spindle motor 104 and/or the optical disc 101, the conventional spindle control loop may fail to track the spindle rotation error caused by the random vibration promptly because of the low response of the spindle motor 104.

Please refer to FIG. 2. FIG. 2 is a diagram illustrating the first problem caused by the spindle rotation error. In FIG. 2, the top portion, FIG. 2(a), shows a visible image without spindle error present, while the bottom portion, FIG. 2(b), shows a visible image with random spindle error present. As shown in FIG. 2, since the spindle control loop is unable to track the transient vibration of each motor revolution cycle of the spindle motor 104 immediately, the induced blurred edges at both sides could degrade the quality of the visible image printed (recorded) on the optical disc 101 when perceptible to human eyes.

In addition to the above-mentioned random spindle error, the spindle rotation error also includes periodic variations. That is, the spindle rotation error is periodic to the rotation angles. The angle-periodic spindle error is usually caused by the unbalanced damping of the spindle motor 104, poor spindle bearing, the eccentric disc, or possible combinations thereof. Please refer to FIG. 3. FIG. 3 is a diagram illustrating the second problem caused by the spindle rotation error. In FIG. 3, the top portion, FIG. 3(a), shows a visible image without spindle error present, the middle portion, FIG. 3(b), shows a visible image with periodic spindle error present, and the bottom portion, FIG. 3(c), shows the rotation speed variation. As one can see, the average rotation speed is fixed at $V_1$; however, the instant rotation speed varies from lowest speed $V_2$ to highest speed $V_3$ periodically, resulting in the perceivable image distortion. Because of the brightness or gray level of the printed image is in proportion to the laser power density per unit area of the recordable disc layer where the visible image is printed thereon. Therefore, different rotation speeds of the spindle motor 104 correspond to different laser power density. As a result, the image area corresponding to the highest rotation speed $V_3$ has lowest brightness or gray level, while the image area corresponding to the lowest rotation speed $V_1$ has highest brightness or gray level. In short, as shown in FIG. 3(b), because of the periodic rotation speed variation, the brightness or gray level of the printed image is not uniform accordingly. It should be noted that human eyes are much more sensitive to the periodic spindle error than the above-mentioned random spindle rotation error.

Facing aforementioned problems, the spindle control loop implemented in the conventional optical disc recording system 100 is unable to solve either of them. Additionally, as shown in FIG. 1, in the spindle control loop the spindle controller 106 uses the FG signal FG_A generated from the spindle motor 104 as a reference to control the spindle motor 104 has two major problems. The first problem is that the frequency of the FG signal FG_A is only several tens times higher than that of the spindle rotation. In a case where the optical disc 101 is rotated at a low rotation speed, the spindle motor 104 may not be well controlled since the feedback signal, the FG signal FG_A, has a quite low frequency. The second problem is that the periods of adjacent FG edges in the FG signal FG_A, detected from many Hall sensors, are not equidistant because of the inaccurate placement of these Hall sensors and the stator slots. As a result, it is not guaranteed that the edges of the FG signal FG_A are equidistant. Therefore, if the spindle controller 106 employs the phase detection means to control the spindle motor 104, the rotation speed control becomes inaccurate.

Please refer to FIG. 4 in conjunction with FIG. 5. FIG. 4 is a block diagram of one conventional embodiment of the spindle controller 106. FIG. 5 is a waveform diagram of an ideal FG signal FG_I, an actual FG signal FG_A and a reference FG signal FG_R. As shown in the circuit configuration of FIG. 4, the spindle controller 106 includes a frequency divider 112, a phase detector 114, and a control circuit 116, where the frequency divider 112 is used for dividing the incoming reference clock $CLK_{ref}$ to generate a reference FG signal FG_R, the phase detector 114 is used for detecting the phase error between the reference FG signal FG_R and an actual FG signal FG_A, and the control circuit 116 is used for controlling the spindle motor 104 to tune the rotation speed according to the measured phase error from the phase detector 114. However, for simplicity, suppose that the actual FG signal FG_A has three FG edges FG0, FG1, FG2 per motor revolution of the spindle motor 104 and periods between two adjacent FG edges are not equidistant. As shown in FIG. 5, the phase error $P_1$, detected by the phase detector 114, indicates that the FG edge FG1 leads the edge of the reference FG signal FG_R, meaning that the current rotation speed of the optical disc 101 is higher that the desired rotation speed. Next, the control circuit 116 will control the spindle motor 104 to slow down its spindle rotation speed. However, the following phase error $P_2$, detected by the phase detector 114, indicates that the FG edge FG1 lags behind the edge of the reference FG signal FG_R, meaning that the current rotation speed of the optical disc 101 is lower that the desired rotation speed. Therefore, the control circuit 116 then controls the spindle motor 104 to speed up it spindle rotation speed. Due to the FG period unbalance, the spindle motor 104, however, is erroneously controlled.

To solve above problem caused by unbalanced FG periods, another conventional spindle controller configuration is disclosed. Please refer to FIG. 6 in conjunction with FIG. 7. FIG. 6 is a block diagram of another conventional embodiment of the spindle controller 106. FIG. 7 is a waveform diagram of an ideal FG signal FG_I, an actual FG signal FG_A, a frequency-divided FG signal FG_DIV, and a reference FG signal FG_R'. As shown in the circuit configuration of FIG. 6, the spindle controller 106 includes a counter 121, a frequency divider 122, a phase detector 124, and a control circuit 126, where the counter 121 is used for counting one FG period of an incoming actual FG signal FG_A to generate a frequency-divided FG signal FG_DIV, the frequency divider 122 is for dividing the incoming reference clock $CLK_{ref}$ to generate a reference FG signal FG_R', the phase detector 124 is used for detecting the phase error between the reference FG signal FG_R' and the frequency-divided FG signal FG_DIV, and the control circuit 126 is used for controlling the spindle motor 104 to tune the spindle rotation speed according to the measured phase error from the phase detector 124. For simplicity, suppose that the actual FG signal FG_A has three FG edges FG0, FG1, FG2 per motor revolution of the spindle motor 104 and periods between two adjacent FG edges are not equidistant. As shown in FIG. 7, the counter 121 is configured to count the first FG edge FG0 to generate the frequency-divided FG signal FG_DIV, and the period of the reference FG signal FG_R' is three times of the period of the aforementioned reference FG signal FG_R. Since only one of the FG edges within one motor revolution (e.g., the FG edge FG0) accounts for detecting the phase error, the above problem caused by unbalanced FG periods is solved. However, because the spindle controller 106 updates the control signal applied to the spindle motor 104 once per motor revolution, the spindle motor control efficiency and accuracy are greatly degraded.

Please refer to FIG. 8. FIG. 8 is a second optical disc recording system 200 according to the related art. The optical disc recording system 200 is configured to print a visible image onto an optical disc 201, such as a CD-R, CD-RW, DVD-R, DVD+RW, DVD-RW, DVD-RAM or other recordable discs. The optical disc recording system 200 comprises an optical pick-up unit (OPU) 202, a spindle motor 204, a spindle controller 206, a draw data generator 208, a laser driver 210, an FG-PLL circuit 212, and a position detector 214. The function and operation of the OPU 202, the spindle motor 204, and the laser driver 210 are almost the same as that of the OPU 102, the spindle motor 104, and the laser driver 110 shown in FIG. 1. In this conventional optical disc recording system 200, the FG-PLL circuit 212 is a phase-locked loop implemented to generate a pulse signal by locking to phase of each FG edge in the FG signal FG_A outputted from the spindle motor 204 per predetermined rotation angle. The position detector 214 receives the pulse signal outputted from the FG-PLL circuit 212 and then determines a position of the OPU 202 in the disc circumferential direction according to the received pulse signal. Next, the draw data generator 208 refers to the position of the OPU 202 to convert an image data into a draw data accordingly. As shown in FIG. 8, the spindle controller 206 also receives the pulse signal generated from the FG-PLL circuit 212, and controls the spindle rotation speed of the spindle motor 204 according to the received pulse signal. As mentioned above, the FG-PLL circuit 212 is used for generating an additional signal for controlling spindle motor by locking to the phase of each FG edge. However, the FG-PLL circuit 212 provides a pulse signal synchronous to an average phase of the FG edges instead of actual phases of the FG edges. As a result, the spindle control loop adopted by the optical disc recording system 200 is only capable of making the spindle rotation speed stable using the steady-state phase information, but it fails to solve the aforementioned problems, edge blurring caused by random spindle error and the inconstant brightness or gray level caused by periodic spindle error.

Please refer to FIG. 9. FIG. 9 is a third optical disc recording system 300 according to the related art. The optical disc recording system 300 is configured to print a visible image onto an optical disc 301, such as a CD-R, CD-RW, DVD-R, DVD+RW, DVD-RW, DVD-RAM or other recordable discs. The optical disc recording system 300 comprises an optical pick-up unit (OPU) 302, a spindle motor 304, a spindle controller 306, a draw data generator 308, a laser driver 310, and a sensor 305. The function and operation of the OPU 302, the spindle motor 304, and the laser driver 310 are almost the same as that of the OPU 102, the spindle motor 104, and the laser driver 110 shown in FIG. 1. In this conventional optical disc recording system 300, the optical disc 301 has rotation marks disposed thereon, where the sensor 305 is implemented to sense the rotation marks. That is, each time a rotation mark passes the sensor 305, the sensor 305 generates a pulse. The spindle controller 306 then uses the pulses outputted from the sensor 305 to control the spindle motor 304. Because the rotation marks are precisely formed on the optical disc 301, the phase information carried by each pulse generated from the sensor 305 can be used by the spindle controller 306 to offer accurate spindle motor control. Additionally, there are many rotation marks disposed on the optical disc 301. It is clear that the frequency of the pulse signal generated from the sensor 305 is much higher than that of the FG signal FG_A generated in response to predetermined rotation angles of the spindle motor 304, allowing the spindle motor 306 to be well controlled to maintain at stable spindle rotation speed. However, even though the rotation error is precisely detected using the sensor 305 to sense the rotation marks, the detected rotation error cannot be eliminated instantly because of the low response of the spindle motor 304. As a result, the spindle control loop adopted by the optical disc recording system 300 still fails to solve the aforementioned problems, edge blurring caused by random spindle error and the inconstant brightness or gray level caused by periodic spindle error.

SUMMARY

It is therefore one of the objectives of the claimed invention to provide a system and method for printing a visible image onto an optical disc through tuning a driving signal of an optical pick-up unit, to solve above-mentioned problems.

According to an exemplary embodiment of the claimed invention, a system for driving an optical pick-up unit to form a visible image onto an optical disc is disclosed. The optical disc is rotated by a spindle motor. The system comprises: a driving circuit, coupled to the optical pick-up unit, for providing a driving signal to drive the optical pick-up unit; and an adjusting circuit, coupled to the driving circuit, for controlling the driving circuit to adjust the driving signal according to a rotation source signal corresponding to a rotation of the optical disc.

According to an exemplary embodiment of the claimed invention, a method for driving an optical pick-up unit to form a visible image onto an optical disc is disclosed. The method comprises: providing a driving signal to drive the optical pick-up unit; and adjusting the driving signal according to a rotation source signal corresponding to a rotation of the optical disc.

These and other objectives of the invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

The invention detects the rotation error according to a rotation source signal, and then adjusts a driving signal used for driving an optical pick-up unit to print the desired visible image onto an optical disc. In other words, compared to the conventional optical disc recording system that tunes the spindle motor to reduce the rotation error, the optical disc recording system of the invention refers to the measured rotation error to tune the driving signal applied to the optical pick-up unit instead, thereby solving the aforementioned edge blurring problem and inconsistent brightness or gray level problem. Further description is given as below.

Figure 1:
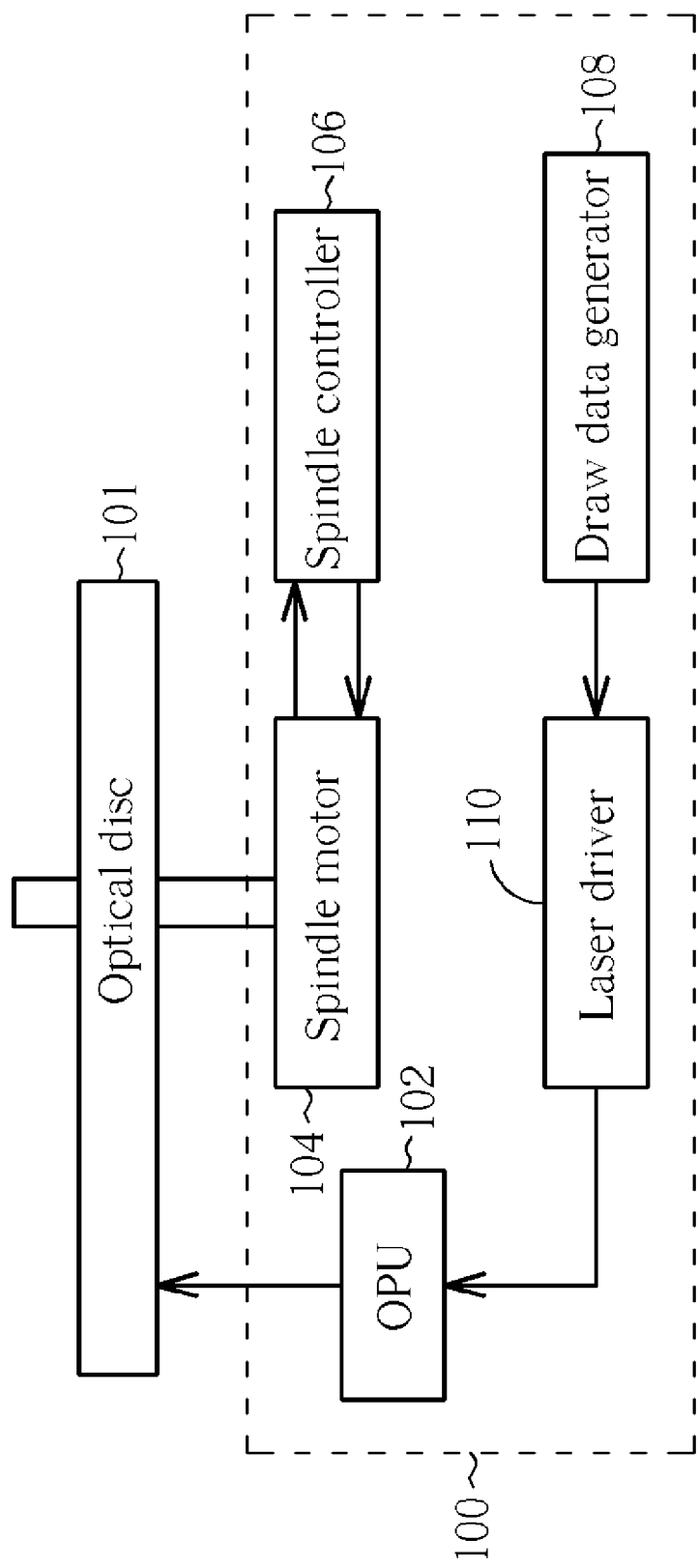
FIG. 1 is a first optical disc recording system according to the related art.
Figure 2:
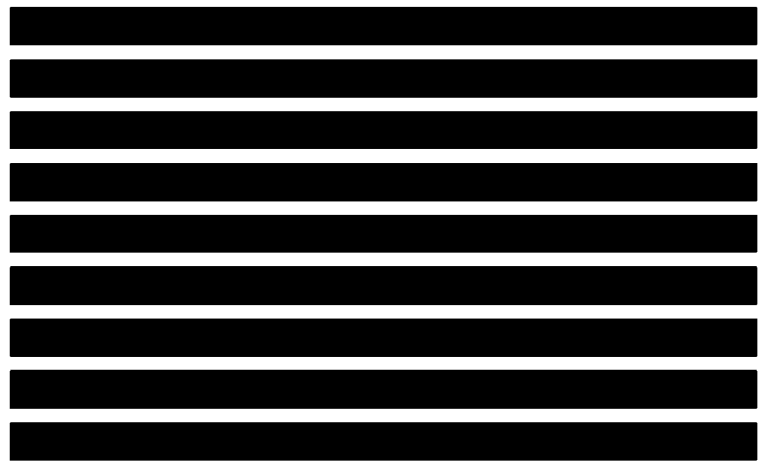
FIG. 2 is a diagram illustrating a first problem caused by a spindle error.
Figure 2:
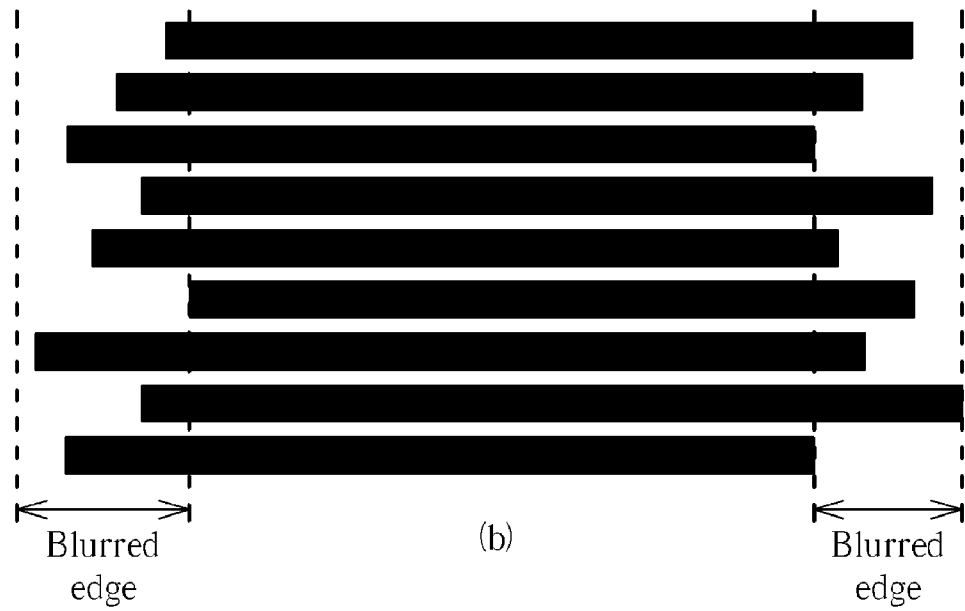
Figure 3:
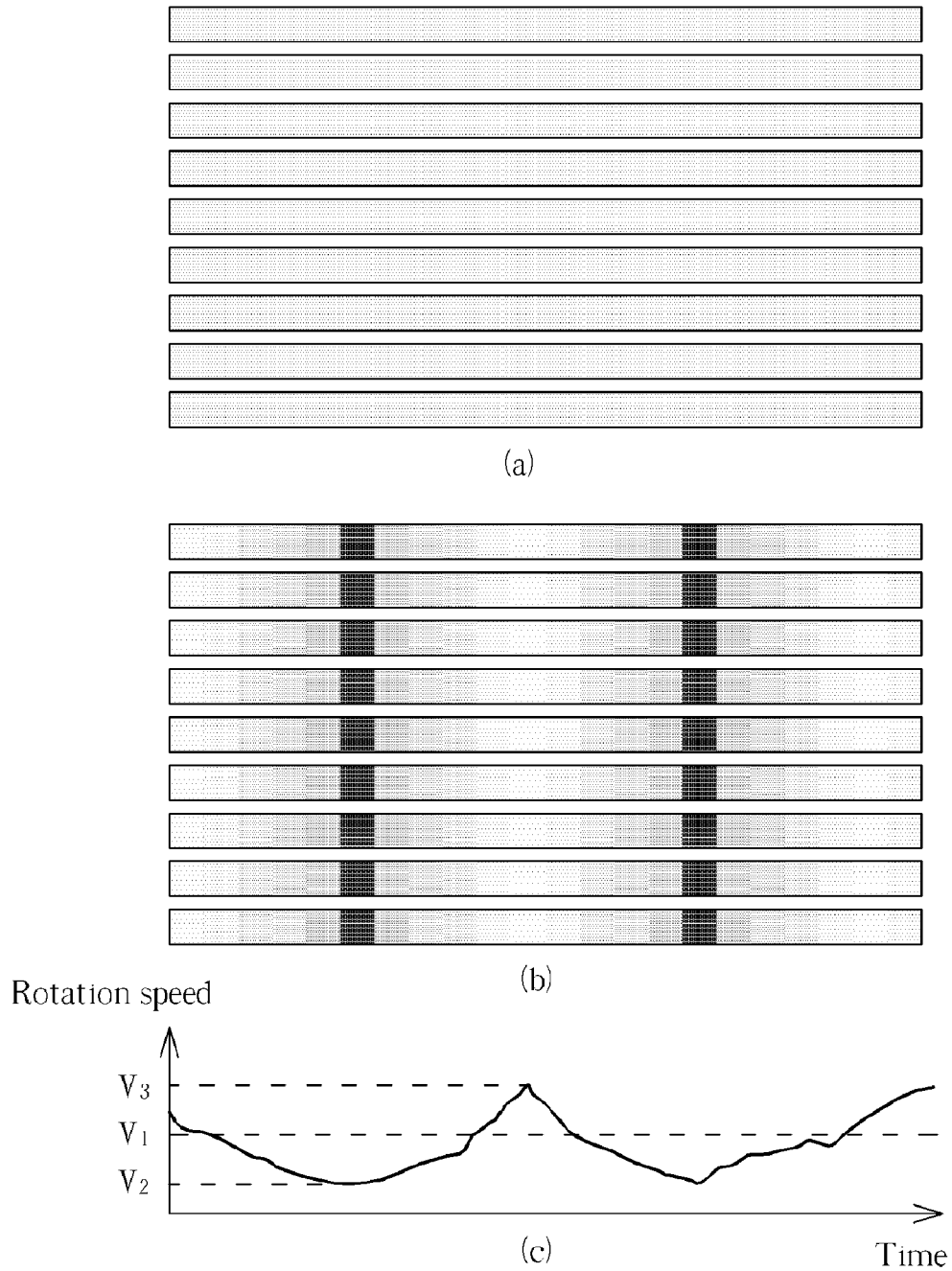
FIG. 3 is a diagram illustrating a second problem caused by a spindle error.
Figure 4:
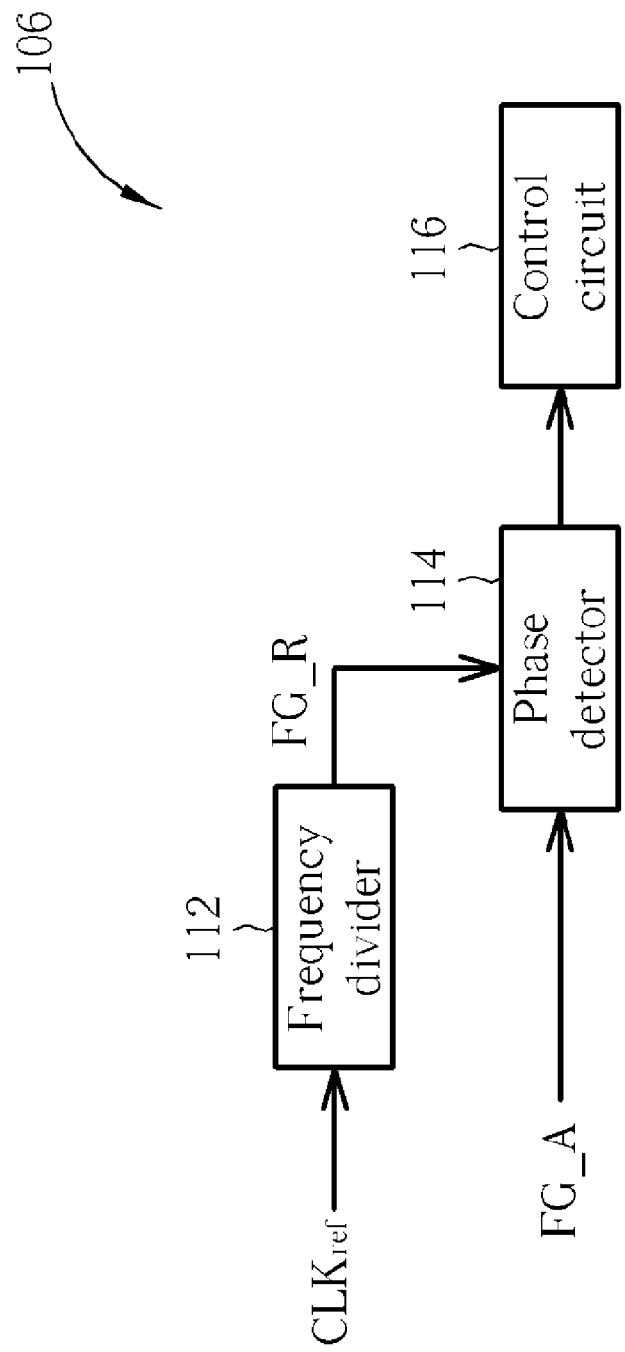
FIG. 4 is a block diagram of one conventional embodiment of a spindle controller shown in FIG. 1.
Figure 5:
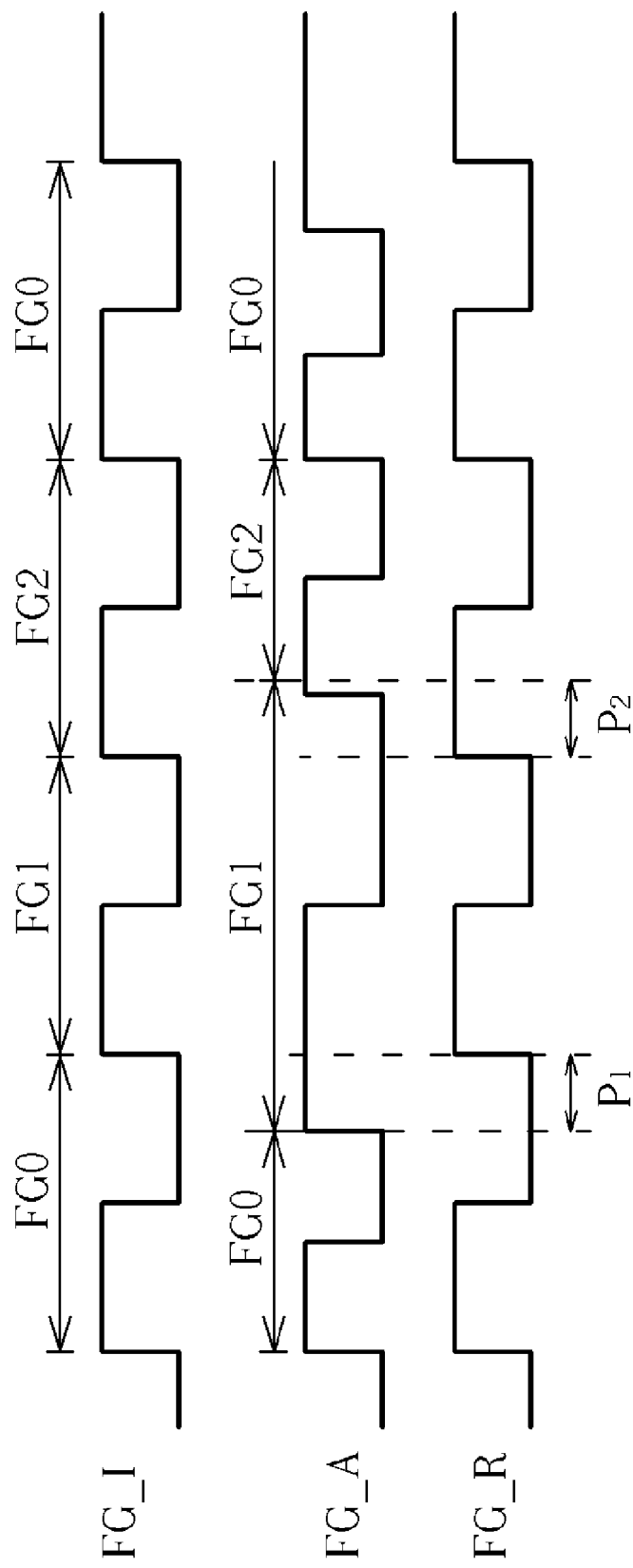
FIG. 5 is a waveform diagram of an ideal FG signal, an actual FG signal and a reference FG signal corresponding to the spindle controller shown in FIG. 4.
Figure 6:
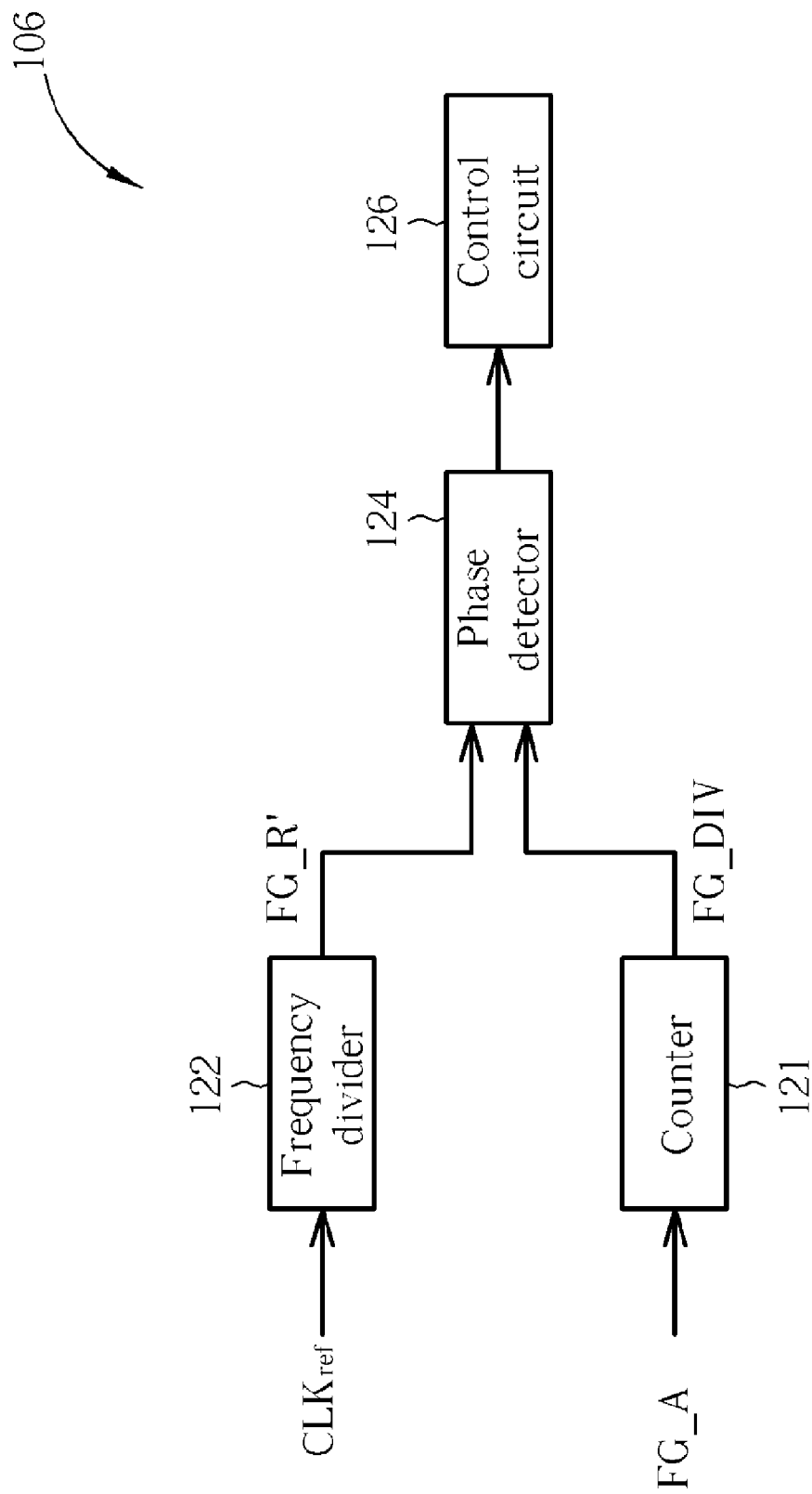
FIG. 6 is a block diagram of another conventional embodiment of the spindle controller shown in FIG. 1.
Figure 7:
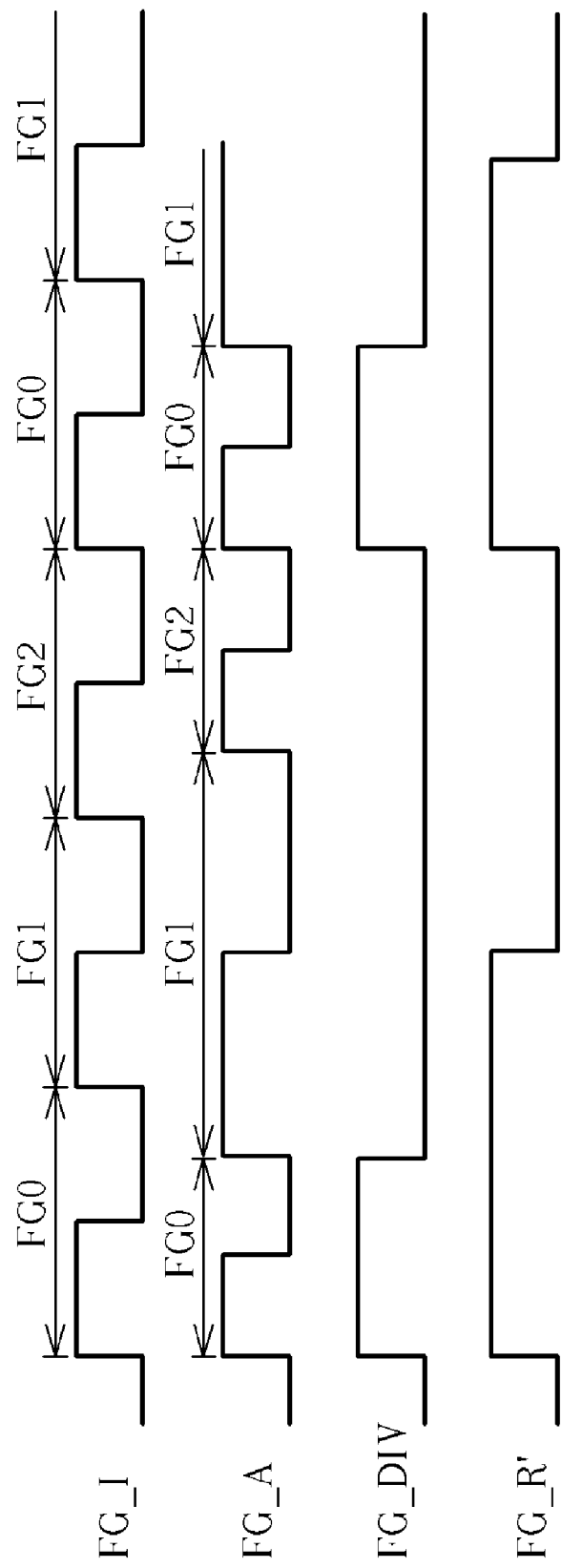
FIG. 7 is a waveform diagram of an ideal FG signal, an actual FG signal, a frequency-divided FG signal, and a reference FG signal corresponding to the spindle controller shown in FIG. 6.
Figure 8:
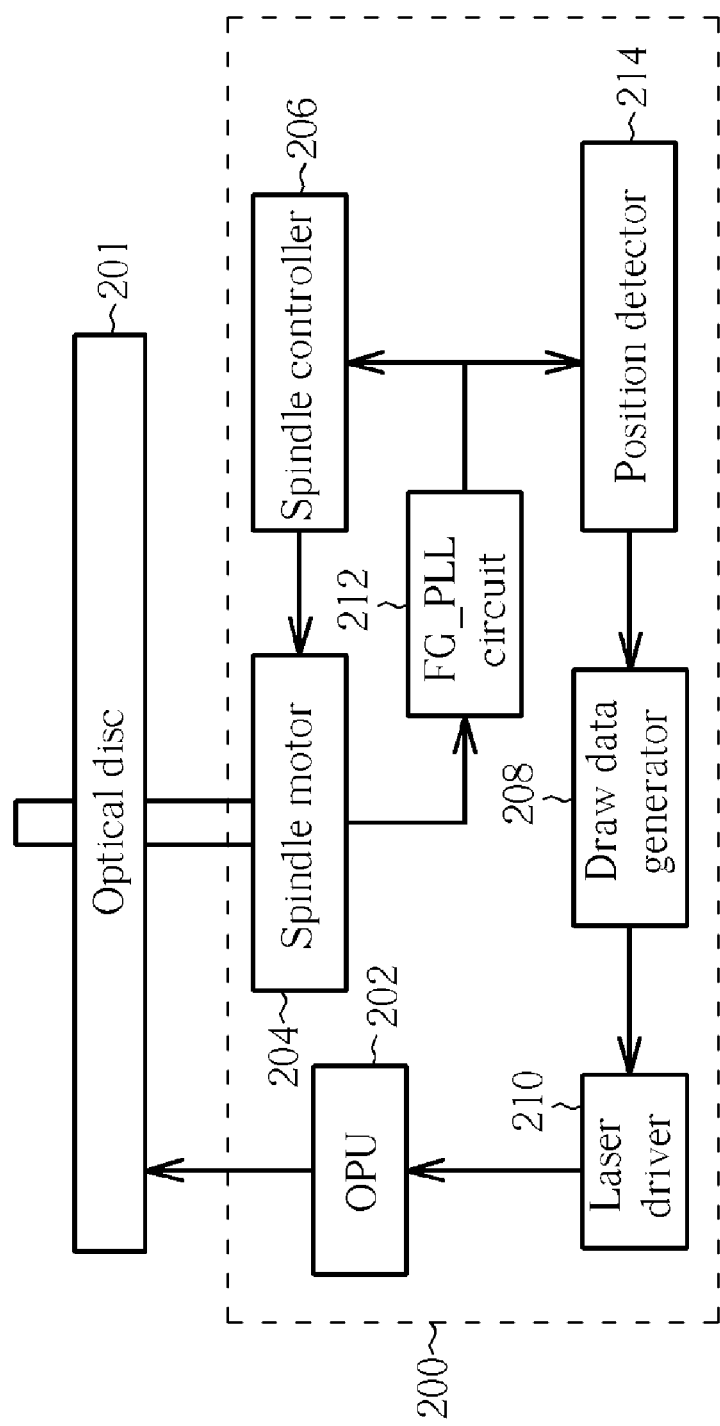
FIG. 8 is a second optical disc recording system according to the related art.
Figure 9:
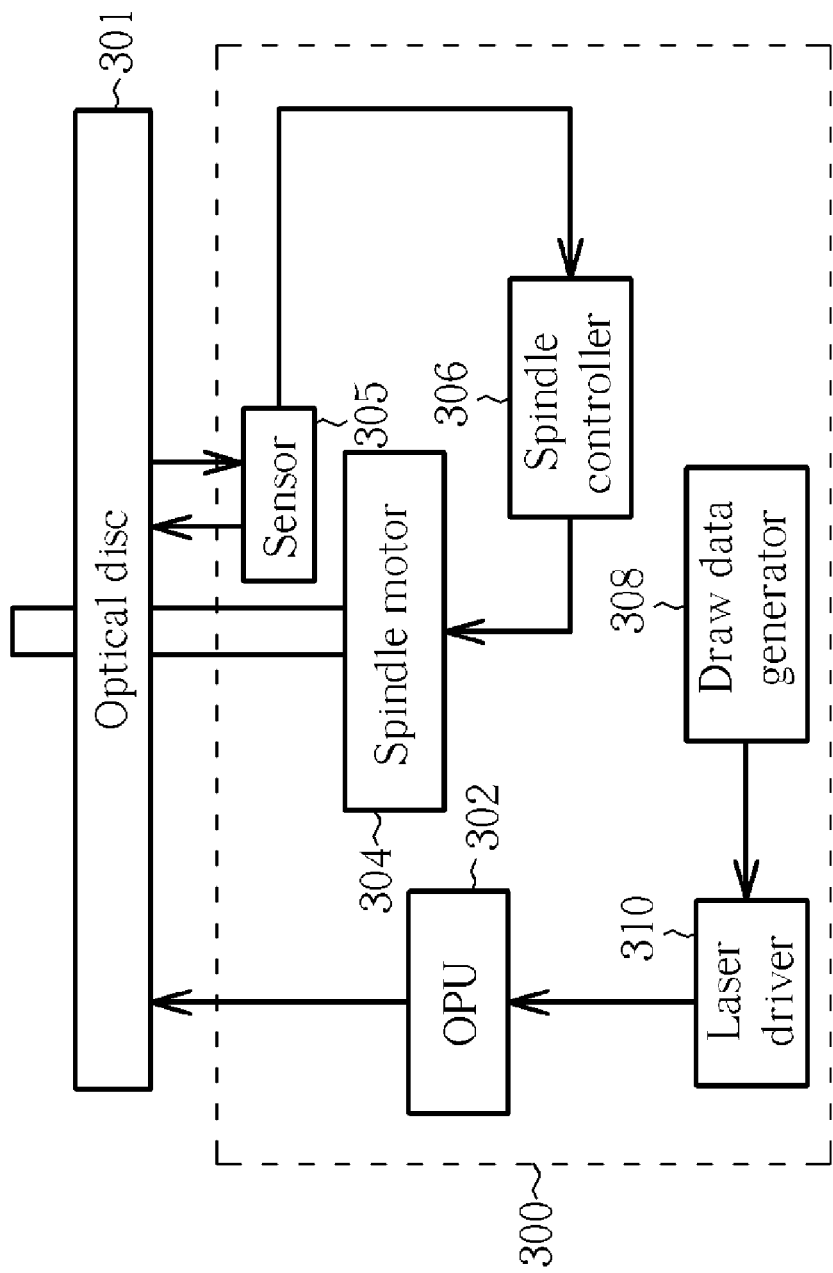
FIG. 9 is a third optical disc recording system according to the related art.
Figure 10:
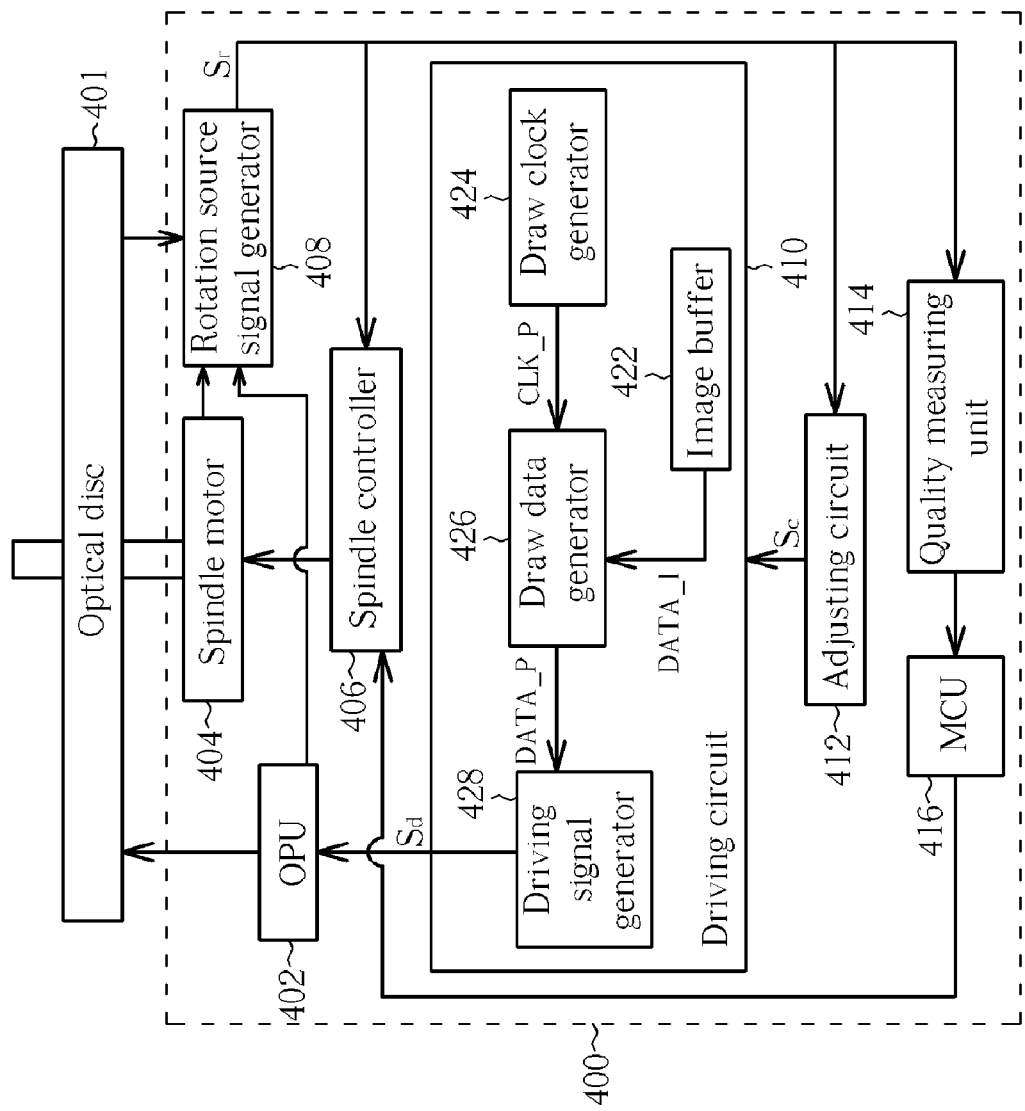
FIG. 10 is an optical disc recording system according to an embodiment of the invention.

Please refer to FIG. 10. FIG. 10 is an optical disc recording system 400 according to an embodiment of the invention. The optical disc recording system 400 is capable of printing a visible image onto an optical disc 401, such as a CD-R, CD-RW, DVD-R, DVD+RW, DVD-RW, DVD-RAM or other recordable discs. The optical disc recording system 400 comprises an optical pick-up unit (OPU) 402, a spindle motor 404, a spindle controller 406, a rotation source signal generator 408, a driving circuit 410, an adjusting circuit 412, a quality measuring unit 414, and a micro-controller unit (MCU) 416. The OPU 402 is driven by a driving signal $S_d$ from the driving circuit 410 to record image data for printing a visible image onto the optical disc 401. The spindle motor 404 is controlled by the spindle controller 406 to rotate the optical disc 401 during the image data recording. In this embodiment, the adjusting circuit 412 is implemented to generate a compensation signal $S_c$ according to a rotation source signal $S_r$ and then output the compensation signal $S_c$ to the driving circuit 410 for tuning the driving signal $S_d$ provided to the OPU 402, thereby reducing error of the disc position of the visible image printed onto the optical disc 401. It should be noted that the invention solves the aforementioned edge blurring problem and inconstant brightness or gray level problem by promptly tuning the driving signal $S_d$ instead of the rotation speed of the spindle motor 404 having low response.

As shown in FIG. 10, the rotation source signal generator 408 is configured to generate the rotation source signal $S_r$. In one embodiment, the rotation source signal generator 408 is implemented by a sensor for detecting rotation marks disposed on the optical disc 401 or disposed on a hub of the spindle motor 404 to generate the rotation source signal $S_r$. In another embodiment, the rotation source signal generator 408 is implemented including a wobble signal generator, and is configured to process signals detected by the OPU 402 to generate a wobble signal serving as the rotation source signal $S_r$. In yet another embodiment, the rotation source signal generator 408 is implemented using Hall sensors for sensing rotations of the spindle motor 404 to generate a frequency generator (FG) signal serving as the rotation source signal $S_r$.

As shown in FIG. 10, the driving circuit 410 includes an image buffer 422, a draw clock generator 424, a draw data generator 426, and a driving signal generator 428. The image buffer 422 is coupled to an external host (e.g., a computer host) for receiving and buffering the image data DATA_I associated with the desired visible image to be printed on the optical disc 401. The draw clock generator 424 is used for generating a draw clock CLK_P. Please note that the draw clock generator 424 could be implemented using any well-known controllable clock generator, such as a PLL, an accumulator-type NCO, or a fraction-N divider. The draw data generator 426 is used for converting the image data DATA_I into the draw data DATA_P according to the draw clock CLK_P. The driving signal generator 428 serves as a laser driver, and is configured to generate the driving signal $S_d$ according to the incoming draw data DATA_P, where the driving signal $S_d$ is capable of controlling the laser power level and laser emitting duration of laser pulses emitted from the OPU 402. An example of the relation between the draw data DATA_P and the draw clock CLK_P and the driving signal $S_d$ is that the driving circuit 410 samples the draw data DATA_P with the draw clock CLK_P, and converts the sampled data to the corresponding laser enable signal. In this embodiment, at least one of the draw clock generator 424, the draw data generator 426, and the driving signal generator 428 is defined to be controlled in response to the received compensation signal $S_c$ to thereby achieve the objective of tuning the driving signal $S_d$. The operation is detailed described later.

In contrast to the related art, the disclosed driving circuit 410 is configured to adjust the driving signal $S_d$ according to an instantaneous error of the rotation position detected from the rotation source signal $S_r$. As described in the following paragraphs, in one embodiment, the driving circuit 410 adjusts the driving signal $S_d$ according to a period of the rotation source signal $S_r$; in another embodiment, the driving circuit 410 adjusts the driving signal $S_d$ according to a relation between the period of the rotation source signal $S_r$ and a reference period; in yet another embodiment, the driving circuit 410 adjusts the driving signal $S_d$ according to a timing relation between the driving signal $S_d$ and the rotation source signal $S_r$. Further description will be detailed later.

In addition to improving the image quality of the printed visible image, the invention also provides a calibration scheme for minimizing the rotation error by setting optimal parameters of rotation control. As shown in FIG. 10, the spindle controller 406 refers to the rotation source signal $S_r$ to measure a rotation error, and then controls the spindle motor 404 to change its spindle rotation speed to compensate the measured rotation error. As mentioned above, the spindle motor 404 has a very low response; therefore, the spindle motor 404 requires a period of time to reduce the measured rotation error. However, if the rotation error could be minimized, the quality of the printed visible image is improved accordingly since the spindle rotation becomes more stable. Referring to FIG. 10, the MCU 416 sets control parameters to the spindle controller 406. The quality measuring unit 414 is coupled to the rotation source signal generator 408 for measuring quality of the rotation source signal $S_r$ under various control parameters which are set by the MCU 416. For example, the MCU 416 sets one test control gain to the spindle controller 406, and then the quality measuring unit 414 measures the period/phase variation of the spindle motor rotation controlled by the spindle controller 406 assigned with the test control gain. After gathering a plurality of measurement results for different control parameters, the MCU 416 selects an optimal control parameter which makes the rotation error minimized, and then outputs the optimal control parameter to configure the spindle controller 406. As a result, in a normal mode, the spindle controller 406 having a proper control parameter determined in a preceding calibration mode is able to reduce the rotation error, thereby improving the quality of the visible image printed onto the optical disc 401. Briefly summarized, the disclosed calibration scheme tries several possible control parameters and then selects the one with acceptable performance.

Figure 11:
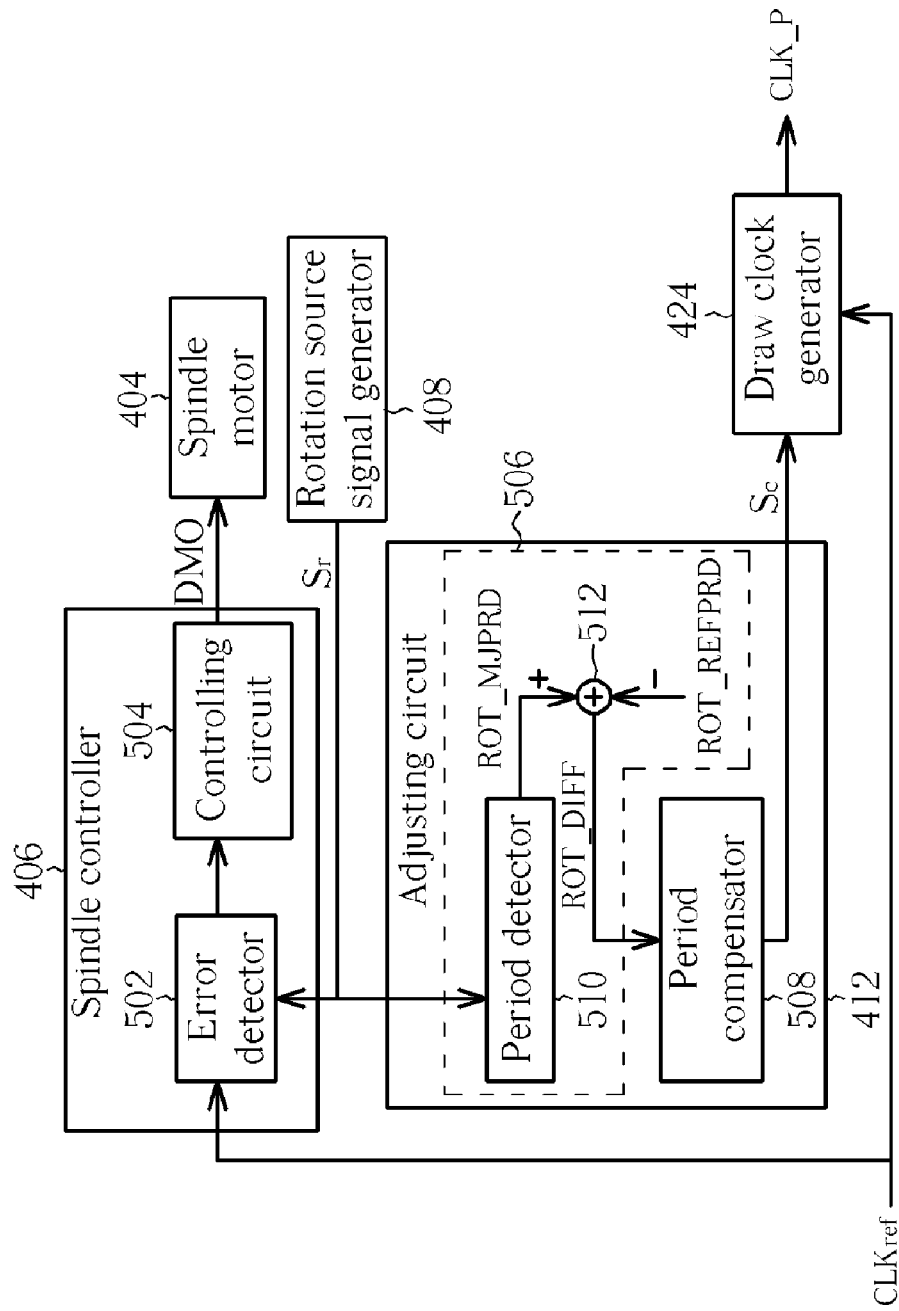
FIG. 11 is a diagram illustrating a first embodiment of adjusting a draw clock to compensate the rotation error.

FIG. 11 is a diagram illustrating a first embodiment of adjusting the draw clock CLK_P to compensate the rotation error. The spindle controller 406 includes an error detector 502 and a controlling circuit 504, where the error detector 502 can be designed to adopt any conventional means to detect the rotation error, and the controlling circuit 504 refers to the detecting result to generate a control signal DMO to control the spindle motor 404. In this embodiment, the spindle motor 404 may not need to be controlled efficiently and accurately because the rotation error can be compensated by adjusting the draw clock CLK_P. In other words, the draw clock CLK_P is adjusted as long as the rotation error is measured or detected.

As shown in FIG. 11, the adjusting circuit 412 includes a rotation error detector 506 and a period compensator 508, wherein the rotation error detector 506 contains a period detector 510 and a comparator 512. The rotation error detector 506 is for detecting a rotation error of the spindle motor 404 according to the rotation source signal $S_r$ to output a detection result ROT_DIFF, and then the period compensator 508 determines the compensating signal $S_c$ according to the detection result ROT_DIFF. In this embodiment, the period detector 510 is used to measure the period of the rotation source signal $S_r$. For example, the period detector 510 counts the actual period using clock cycles of the reference clock $CLK_{ref}$; however, this is not meant to be a limitation of the invention. Other detection schemes capable of estimating the actual period are allowed to be adopted in the invention. Next, the comparator 512 compares the measured period value ROT_MJPRD with an ideal period value ROT_REFPRD, and then computes a difference between the measured period value ROT_MJPRD and the ideal period value ROT_REFPRD to serve as the detection result ROT_DIFF. After receiving the compensating signal $S_c$ from the period compensator 508, the draw clock generator 424 adjusts at least one period of the draw clock CLK_P. That is, in one embodiment, one clock period of the draw clock CLK_P is adjusted to compensate the whole measured period error; in another embodiment, multiple clock periods of the draw clock CLK_P are adjusted to compensate the whole measured period error, where each clock period is changed in response to a part of the measured period error. The same objective of tuning the draw clock CLK_P in response to the measured rotation error to adjust the driving signal $S_d$ for printing the visible image onto correct positions of the optical disc 401 is achieved. For example, when the detection result ROT_DIFF is detected 10 clock cycles of the reference clock CLKref, the compensating signal $S_c$ controls the draw clock generator 424 to increase one period of the draw clock CLK_P with 10 clock cycles.

Figure 12:
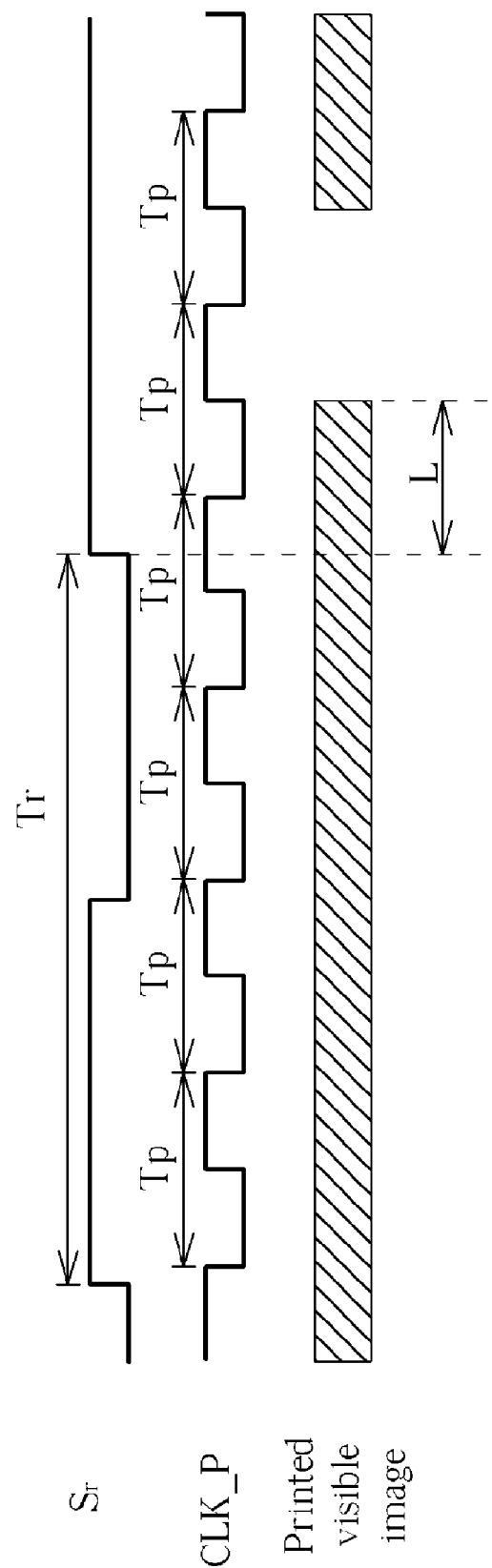
FIG. 12 is a diagram illustrating a print result when there is no rotation error measured by an adjusting circuit.
Figure 13:
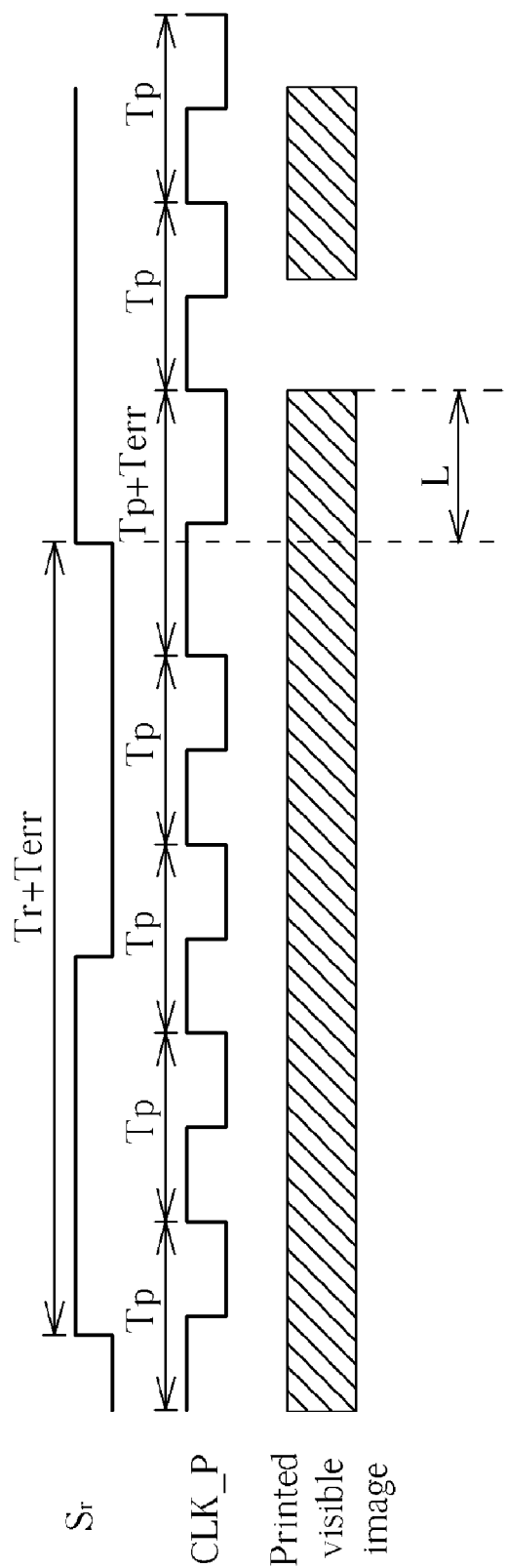
FIG. 13 is a diagram illustrating a print result when there is a positive period error measured by the adjusting circuit.
Figure 14:
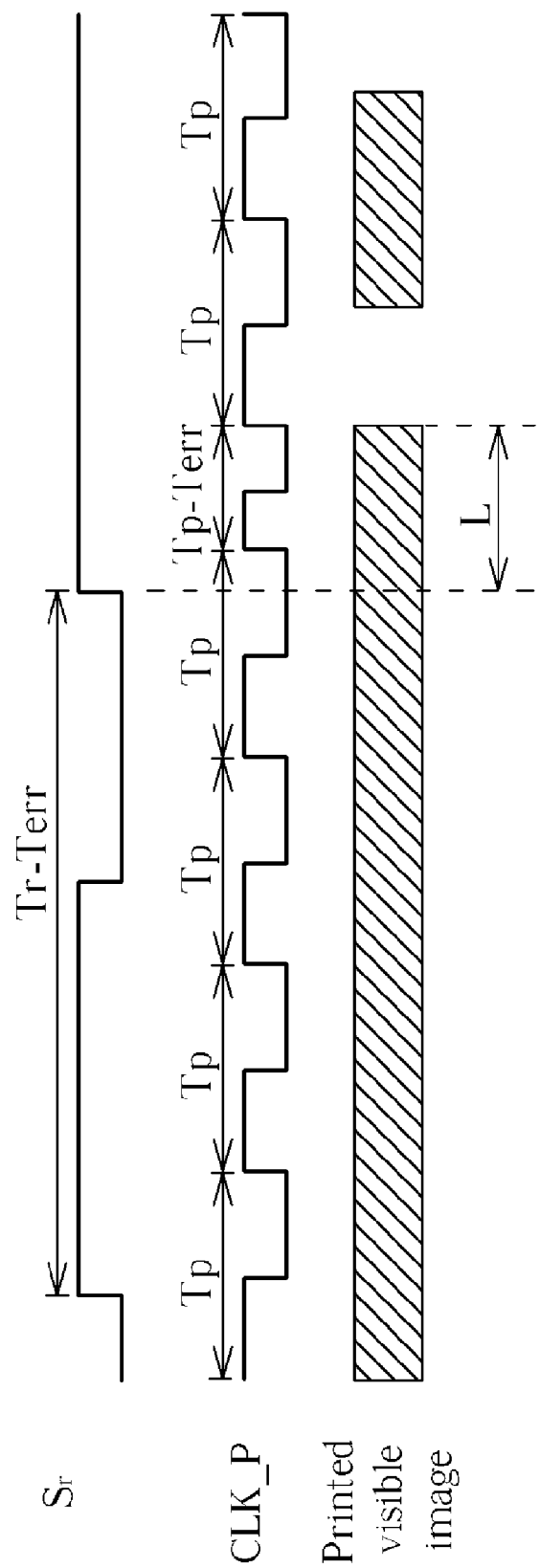
FIG. 14 is a diagram illustrating a print result when there is a negative period error measured by the adjusting circuit.

Please refer to FIGS. 12-14. FIG. 12 is a diagram illustrating a print result when there is no rotation error measured by the adjusting circuit 412. FIG. 13 is a diagram illustrating a print result when there is a positive period error detected by the adjusting circuit 412. FIG. 14 is a diagram illustrating a print result when there is a negative period error measured by the adjusting circuit 412. As shown in FIG. 12, the ideal period of the rotation source signal $S_r$ is represented by $T_r$, and the ideal period of the draw clock CLK_P is represented by $T_p$. In a case where there is no rotation error, the printed visible image has a specific position relation L on the optical disc 401. As shown in FIG. 13, the actual period $T_r+T_{err}$ of the rotation source signal $S_r$ is longer than the ideal period $T_r$, meaning that the spindle rotation speed of the spindle motor 404 is too slow. Suppose that the period compensator 508 is configured to instruct the draw clock generator 424 to compensate the clock period for the measured rotation error within one clock cycle. Therefore, one adjusted clock period $T_p+T_{err}$ becomes longer than that of the ideal clock (e.g. period $T_p$). In this way, the same position relation L on the optical disc 401 is maintained for the printed visible image, thereby solving the edge blurring problem. Similarly, referring to FIG. 14, the actual period $T_r-T_{err}$ of the rotation source signal $S_r$ is shorter than the ideal period $T_r$, meaning that the spindle rotation speed of the spindle motor 404 is too fast. Suppose that the period compensator 508 is configured to instruct the draw clock generator 424 to compensate the clock period for the measured rotation error within one clock cycle. Therefore, one adjusted clock period $T_p-T_{err}$ becomes shorter than that of the ideal clock (e.g. period $T_p$). In this way, the same position relation L on the optical disc 401 is maintained for the printed visible image, thereby solving the edge blurring problem.

It should be noted that the period compensator 508 can be optionally configured to compensate an additional error amount in advance, where the additional error amount is predicted according to previously measured rotation errors, i.e., a learning result. For example, regarding the random rotation error with slow variation, the amount of advance compensation is determined by the trend of rotation error detected from previously measured rotation errors. Similarly, regarding the angle-periodic rotation error that repeats as the same rotation angle per motor revolution, the amount of advance compensation is determined by the measured rotation errors of previous motor revolutions.

Figure 15:
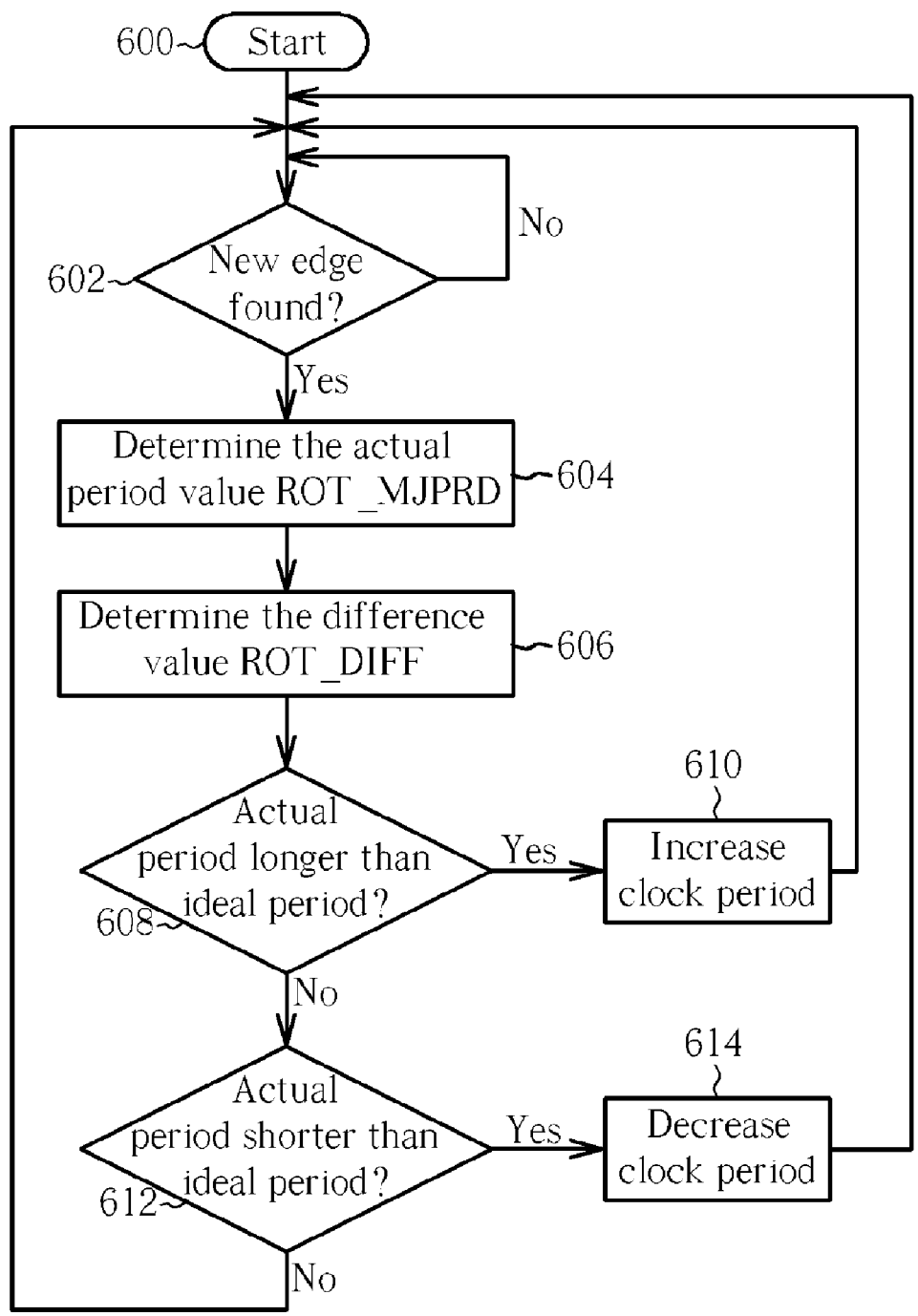
FIG. 15 is a flowchart illustrating a method of adjusting the draw clock to compensate the measured rotation error according to an embodiment of the invention.

FIG. 15 is a flowchart illustrating a method of adjusting the draw clock CLK_P to compensate the measured rotation error according to an embodiment of the invention. Adjusting one or more clock periods of the draw clock CLK_P is summarized as below.

Step 600: Start.
Step 602: The period detector 510 detects if there is a new edge found in the rotation source signal $S_r$. If yes, go to step 604; otherwise, repeat step 602 to keep monitoring the occurrence of a new edge.
Step 604: The period detector 510 measures the time interval between the current edge and the last edge to determine the actual period value ROT_MJPRD.
Step 606: The comparator 512 compares the measured period value ROT_MJPRD with the ideal period value ROT_REFPRD to output a difference value ROT_DIFF as the detection result.
Step 608: The period compensator 508 detects if the difference value ROT-DIFF indicates that the actual period ROT_MJPRD is longer than an ideal period ROT_REFPRD. If yes, go to step 610; otherwise, go to step 612.
Step 610: In order to compensate the measured period error, the period compensator 508 outputs the compensating signal $S_c$ for instructing the draw clock generator 424 to increase the period of a single clock cycle or periods of multiple clock cycles. Go to step 602.
Step 612: The period compensator 508 detects if the difference value ROT-DIFF indicates that the actual period ROT_MJPRD is shorter than an ideal period ROT_REFPRD. If yes, go to step 614; otherwise, go to step 602.
Step 614: In order to compensate the measured period error, the period compensator 508 outputs the compensating signal $S_c$ for instructing the draw clock generator 424 to decrease the period of a single clock cycle or periods of multiple clock cycles. Go to step 602.

Since the details of adjusting the draw clock CLK_P to compensate the measured rotation error have been described above, further description of the steps shown in FIG. 15 is omitted here for the sake of brevity.

Figure 16:
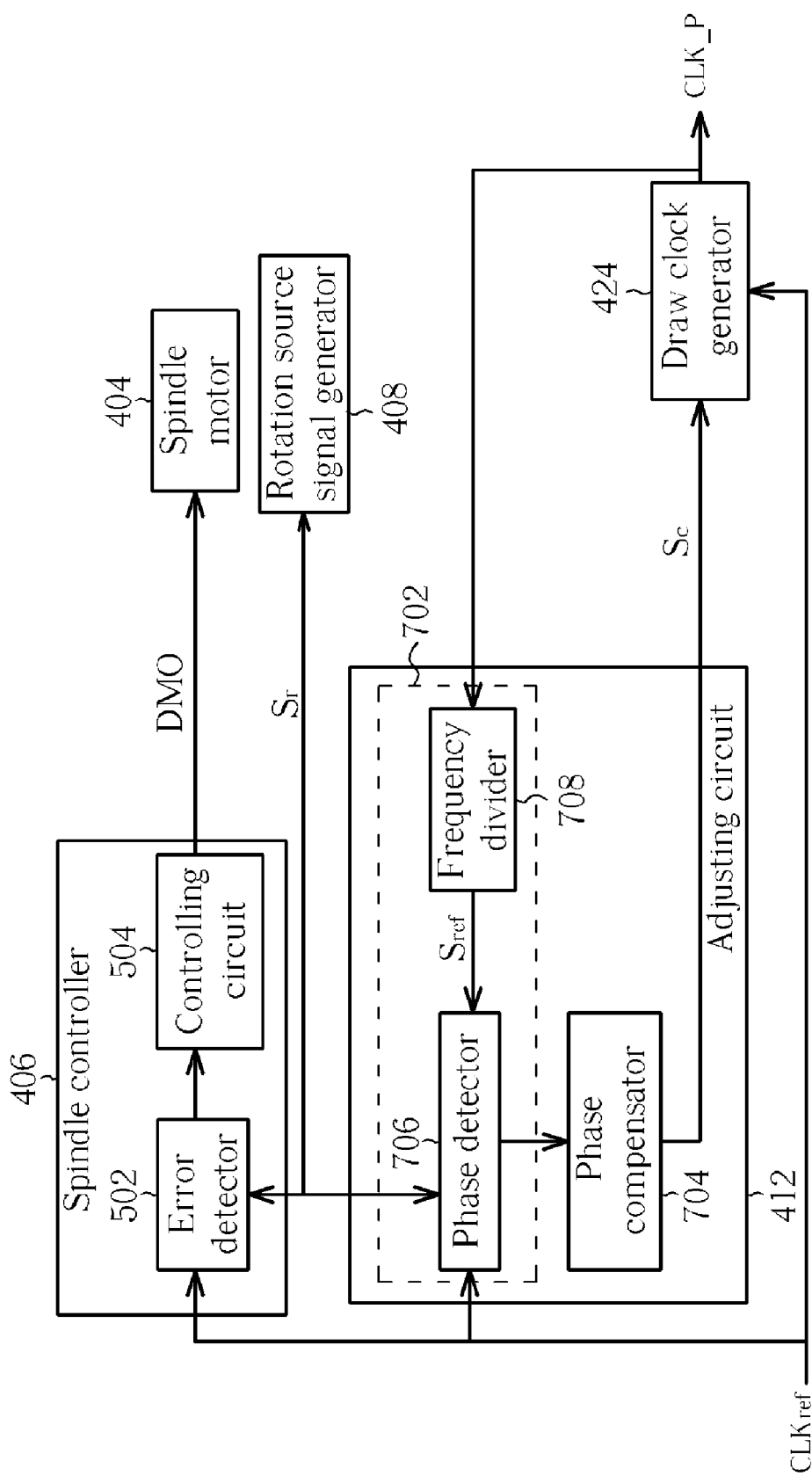
FIG. 16 is a diagram illustrating a second embodiment of adjusting the draw clock to compensate the rotation error.

Please refer to FIG. 16. FIG. 16 is a diagram illustrating a second embodiment of adjusting the draw clock CLK_P to compensate the rotation error. As mentioned above, the error detector 502 can be designed to adopt any conventional means to detect the rotation error, and the controlling circuit 504 refers to the detecting result to generate a control signal DMO to control the spindle motor 404. In this embodiment, the spindle motor 404 may not need to be controlled efficiently and accurately because the rotation error can be compensated by adjusting the draw clock CLK_P. That is, the draw clock CLK_P is adjusted as long as the rotation error is measured. In this embodiment, the adjusting circuit 412 includes a rotation error detector 702, having a phase detector 706 and a frequency divider 708, and a phase comparator 704.

Figure 17:
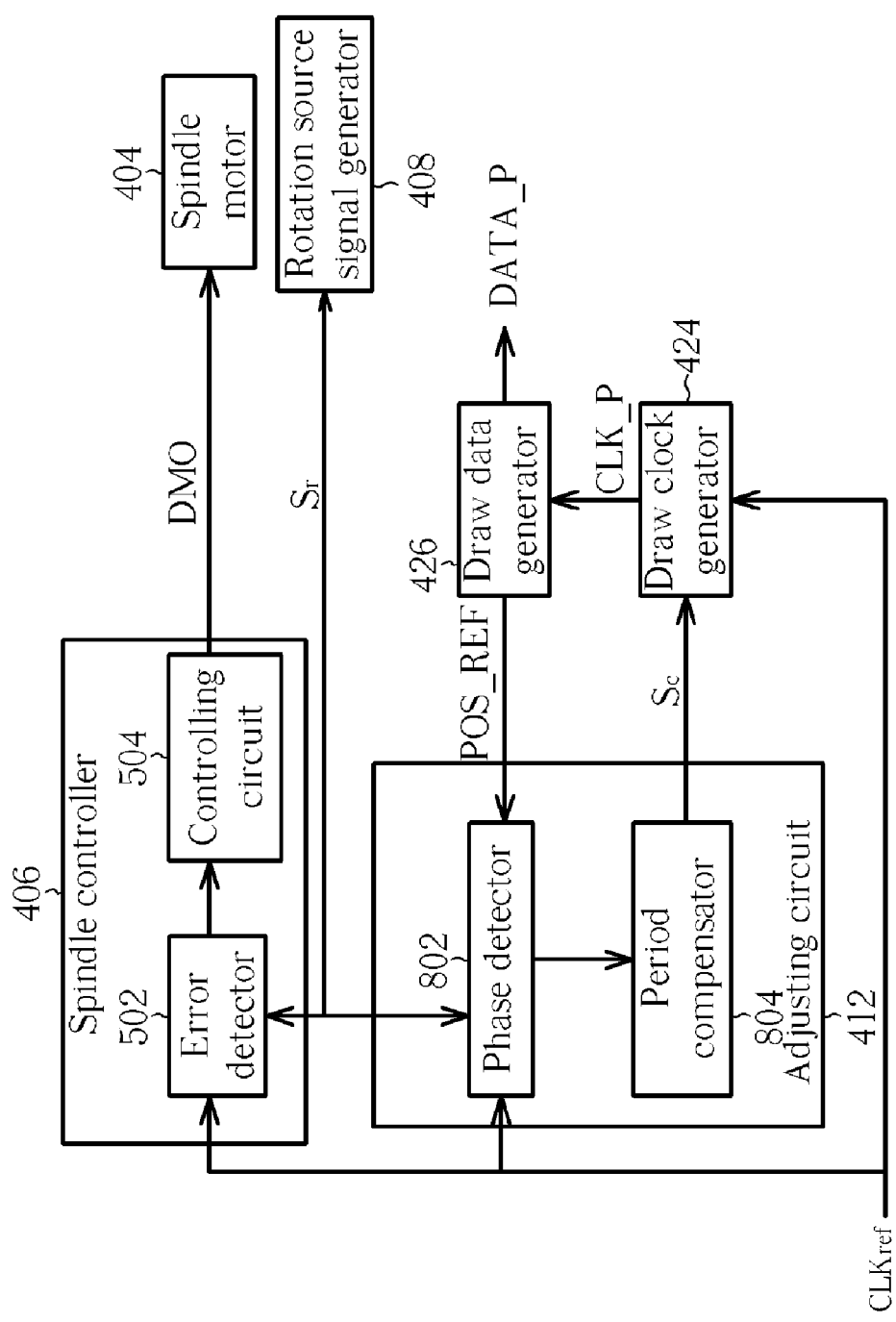
FIG. 17 is a diagram illustrating a third embodiment of adjusting the draw clock to compensate the rotation error.

Because the frequency of the draw clock CLK_P is higher than that of the rotation source signal $S_r$, the frequency divider 708 is well designed to divide the draw clock CLK_P to generate a reference signal $S_{ref}$ having lower frequency, for example, substantially identical to that of the rotation source signal $S_r$. Next, the phase detector 706 detects a phase error between the reference signal $S_{ref}$ and the rotation source signal $S_r$ to estimate the rotation error. The phase compensator 704 then refers to the measured phase error to output a compensating signal $S_c$ to the draw clock generator 424. After receiving the compensating signal $S_c$ from the phase compensator 704, the draw clock generator 424 adjusts at least one clock cycle of the draw clock CLK_P. Similarly, in one embodiment, the phase of one clock cycle is adjusted to compensate the whole measured phase error; in another embodiment, phases of multiple clock cycles are adjusted to compensate the whole measured phase error, where the phase of each clock cycle is changed in response to a part of the measured phase error. The same objective of tuning the draw clock CLK_P in response to the measured rotation error to adjust the driving signal $S_d$ for printing the visible image onto correct positions of the optical disc 401 is achieved. For example, when the phase error is detected faster with the amount of 10 ideal periods of clock CLK_P, the compensating signal Sc controls the draw clock generator 424 reduce the period of the following 20 cycles of clock CLK_P to a half, so that both the timing of DATA_P and the timing of the reference signal $S_{ref}$ are adjusted faster with the amount of 10 ideal periods of clock CLK_P. Please refer to FIG. 17. FIG. 17 is a diagram illustrating a third embodiment of adjusting the draw clock CLK_P to compensate the rotation error. As mentioned above, the error detector 502 can be designed to adopt any conventional means to detect the rotation error, and the controlling circuit 504 refers to the detecting result to generate a control signal DMO to control the spindle motor 404. In this embodiment, the spindle motor 404 may not need to be controlled efficiently and accurately because the rotation error can be compensated by adjusting the draw clock CLK_P. In other words, the draw clock CLK_P is adjusted as long as the rotation error is measured. In this embodiment, the adjusting circuit 412 includes a phase detector 802 and a phase comparator 804, where the phase detector 802 acts as a rotation error detector to estimate the rotation error. The draw data generator 426 is configured to output a reference signal POS_REF synchronous to the generated draw data DATA_P. For example, the reference signal POS_REF has a plurality of pulses each indicating a data boundary per track. Therefore, the phase detector 802 detects a phase error between the reference signal POS_REF and the rotation source signal $S_r$ to estimate the rotation error. Next, the phase compensator 804 refers to the measured phase error to output a compensating signal $S_c$ to the draw clock generator 424. After receiving the compensating signal $S_c$ from the phase compensator 804, the draw clock generator 424 adjusts at least one clock cycle of the draw clock CLK_P. As mentioned above, in one embodiment, the phase of one clock cycle is adjusted to compensate the whole measured phase error; in another embodiment, phases of multiple clock cycles are adjusted to compensate the whole measured phase error, where the phase of each clock cycle is changed in response to a part of the measured phase error. The same objective of tuning the draw clock CLK_P in response to the measured rotation error to adjust the driving signal $S_d$ for printing the visible image onto correct positions of the optical disc 401 is achieved. For example, when the phase error is detected faster with the amount of 10 ideal periods of clock CLK_P, the compensating signal Sc controls the draw clock generator 424 reduce the period of the following 20 cycles of clock CLK_P to a half, so that both the timing of DATA_P and the timing of the reference signal POS_REF are adjusted faster with the amount of 10 ideal periods of clock CLK_P.

Above exemplary embodiments shown in FIGS. 11, 16, and 17 illustrate schemes that compensate the instantaneous rotation error by adjusting the draw clock CLK_P. However, as known to those skilled in this art, the driving signal $S_d$ also can be adjusted by tuning the draw data DATA_P. In a case where the rotation error compensation is fulfilled by adjusting the draw data DATA_P instead of the draw clock CLK_P, the adjusting circuit 412 shown in FIG. 10 outputs the compensating signal $S_c$ to the draw data generator 426 to adjust contents of the generated draw data DATA_P. Using one of the circuit configurations of the adjusting circuits shown in FIGS. 11, 16, and 17, the compensating signal $S_c$ is generated in response to the measured positive rotation error (i.e., the positive phase error or period error) or the negative rotation error (i.e., the negative phase error or period error). A first exemplary embodiment of draw data compensation is to control the duration of the draw data according to the compensation signal by extending the duration of the draw data for compensating the positive rotation error and reducing the duration of the draw data for compensating the negative rotation error. A second exemplary embodiment of draw data compensation is to control a data amount of the draw data according to the compensation signal by inserting/repeating data for compensating the positive rotation error and discarding data for compensating the negative rotation error. For example, when the measured rotation error is detected faster with the amount of 10 cycles of clock CLK_P, the compensating signal Sc controls the draw data generator 426 discard a data with a amount of 10 cycles of clock CLK_P from the following draw data DATA_P.

Instead of adjusting the draw data DATA_P according to the measured rotation error, a third exemplary embodiment of draw data compensation is to load data related to a detected edge of the rotation source signal $S_r$. That is, the adjusting circuit 412 outputs the compensation signal $S_c$ to inform the draw data generator 426 of the occurrence of an edge of the rotation source signal $S_r$. After informed by the compensation signal $S_c$, the draw data generator 426 directly loads data associated with the edge into the draw data DATA_P, thereby forcing the following draw data DATA_P to be automatically aligned to the desired recording positions on the optical disc 401. For example, when the measured rotation error is detected slower with the amount of 10 cycles of clock CLK_P, the compensating signal Sc controls the draw data generator 426 loads the following draw data DATA_P to the data of 10 cycles of clock CLK_P next to origin draw data to be outputted.

The aforementioned draw data compensation and draw clock compensation are used for solving the edge blurring problem. Regarding the inconstant brightness or gray level problem, the solution presented by the invention is detailed as below. As known to those skilled in this art, the driving signal $S_d$ is used for driving the OPU 402 to output a plurality of laser pulses upon the optical disc 401 to record the draw data (i.e., to print the visible image). In order to compensate the angle-periodic rotation error mentioned above, the invention is capable of adjusting the driving signal $S_d$ to tune the characteristics of the laser pulses, making the printed visible image have substantially uniform brightness or gray level distribution.

Figure 18:
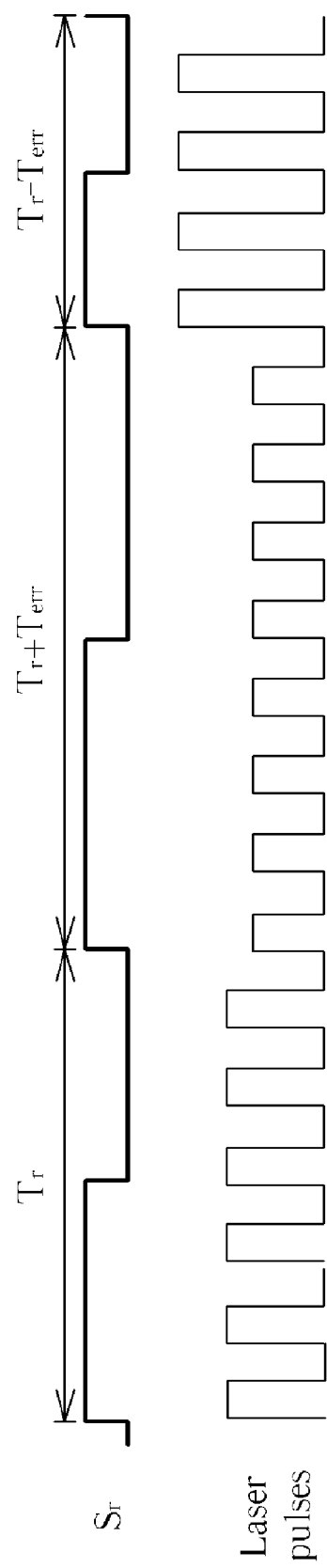
FIG. 18 is a diagram illustrating a first compensation result according to the driving signal compensation of the invention.

For example, in a case where the rotation error compensation is fulfilled by adjusting the driving signal $S_d$, the adjusting circuit 412 shown in FIG. 10 outputs the compensating signal $S_c$ to the driving signal generator 428 to adjust waveform of the driving signal $S_d$. For example, using one of the circuit configurations of the adjusting circuits shown in FIGS. 11, 16, and 17, the compensating signal $S_c$ is generated in response to the measured positive rotation error (i.e., the positive phase error or period error) or the negative rotation error (i.e., the negative phase error or period error). A first exemplary embodiment of driving signal compensation is to adjust the driving signal $S_d$ for controlling the magnitude of the laser pulses according to the compensation signal by reducing the laser power level for compensating the positive rotation error and increasing the laser power level for compensating the negative rotation error. The compensation result is shown in FIG. 18.

Figure 19:
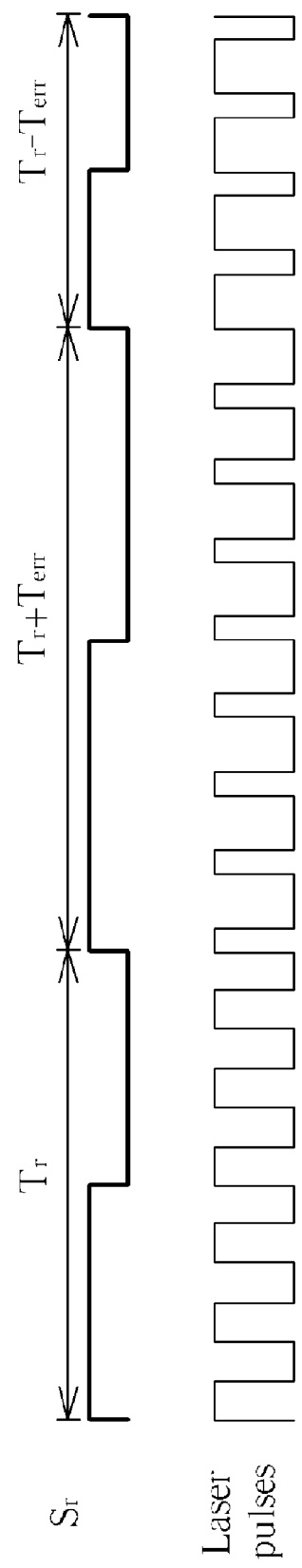
FIG. 19 is a diagram illustrating a second compensation result according to the driving signal compensation of the invention.

A second exemplary embodiment of driving signal compensation is to adjust the driving signal $S_d$ for controlling duty cycles of the laser pulses according to the compensation signal by reducing the duty cycle for compensating the positive rotation error and decreasing the duty cycle for compensating the negative rotation error. The compensation result is shown in FIG. 19.

Suppose that the rotation source signal outputted from the rotation source signal generator 408 shown in FIG. 10 is the FG signal. An alternative design of the adjusting circuit 412 is adopting a one-to-one detection scheme for determining the compensating signal $S_c$ referred to by the driving signal generator 428 for performing above-mentioned driving signal compensation, by the draw data generator 426 for performing above-mentioned draw data compensation, or by the draw clock generator 424 for performing above-mentioned draw clock compensation. Though the FG signal has a problem that the adjacent FG edges are not equidistant, the distance between the same FG edge in adjacent motor revolutions is representative of the actual rotation period of the motor revolution.

Figure 20:
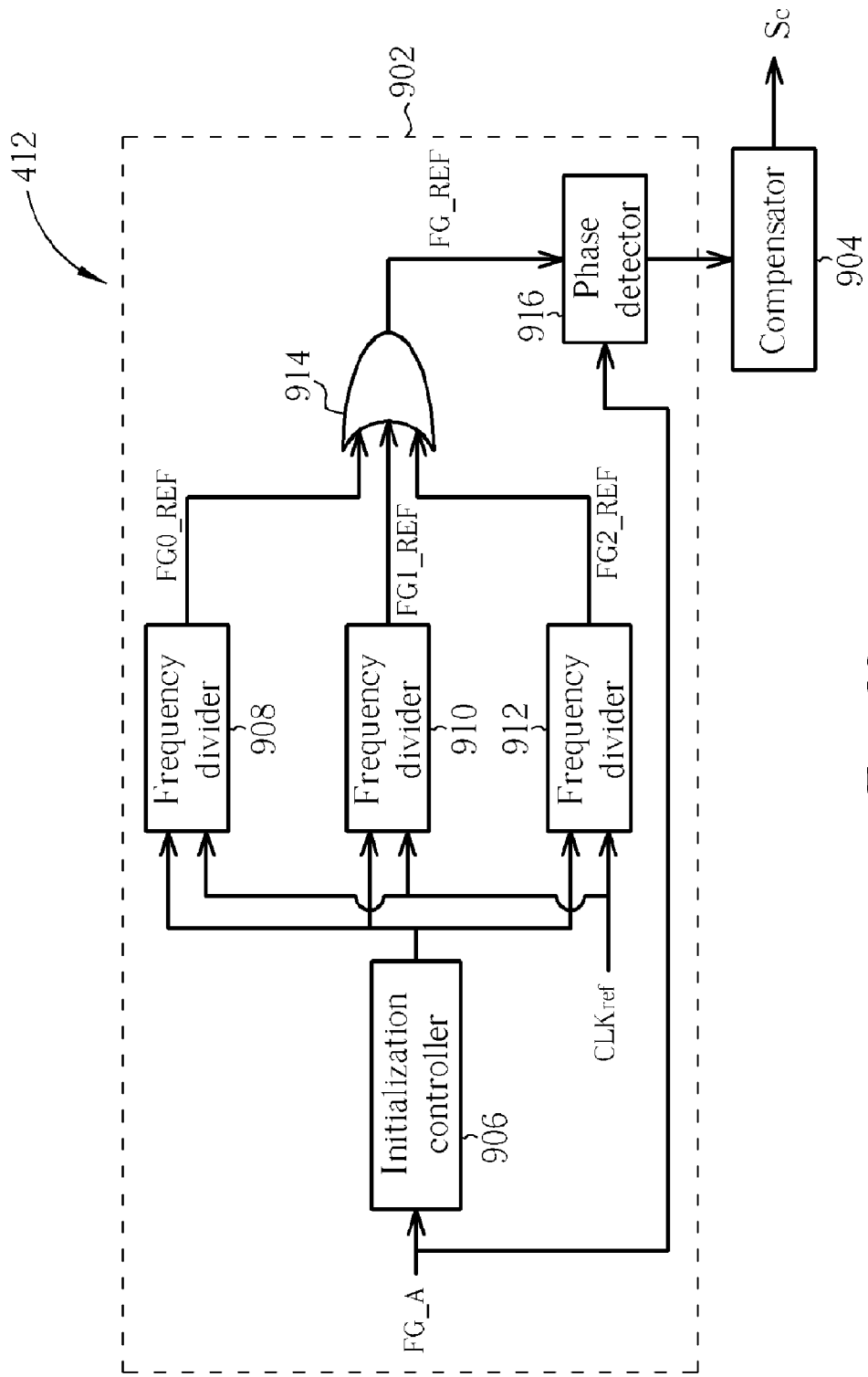
FIG. 20 is a diagram illustrating an alternative design of the adjusting circuit shown in FIG. 10 that adopts a first one-to-one detection scheme.
Figure 21:
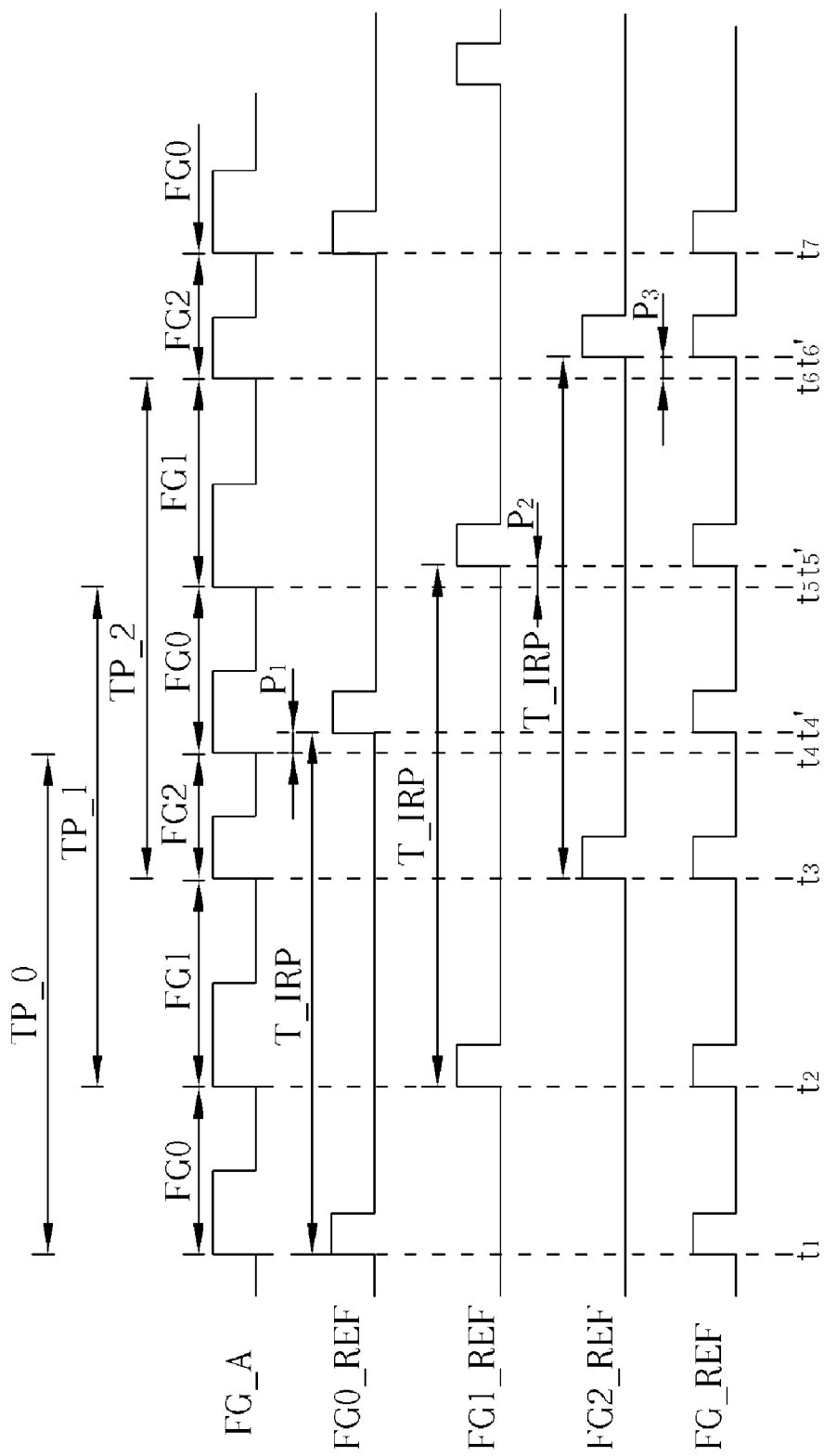
FIG. 21 is a waveform diagram illustrating an FG signal, a plurality of reference signals, and a resultant signal.

Please refer to FIG. 20 and FIG. 21. FIG. 20 is a diagram illustrating an alternative design of the adjusting circuit 412 shown in FIG. 10 that adopts a first one-to-one detection scheme. FIG. 21 is a waveform diagram illustrating an FG signal FG_A, a plurality of reference signals FG0_REF, FG1_REF, FG2_REF, and a resultant signal FG_REF. For simplicity, suppose that each motor revolution of the spindle motor 404 will make the FG signal FG_A have three FG edges FG0, FG1, and FG2 shown in FIG. 21. As one can see, these the periods between FG edges FG0, FG1, and FG2 are not identical. Additionally, in one motor revolution of the spindle motor 404, an FG edge FG0 corresponding to a first predetermined rotation angle starts at $t_1$ and ends at $t_2$, an FG edge FG1 corresponding to a second predetermined rotation angle starts at $t_2$ and ends at $t_3$, and an FG edge FG2 corresponding to a third predetermined rotation angle starts at $t_3$ and ends at $t_4$; regarding the next motor revolution of the spindle motor 404, an FG edge FG0 corresponding to the first predetermined rotation angle starts at $t_4$ and ends at $t_5$, an FG edge FG1 corresponding to the second predetermined rotation angle starts at $t_5$ and ends at $t_6$, and an FG edge FG2 corresponding to the third predetermined rotation angle starts at $t_6$ and ends at $t_7$. Since both of the start ends $t_1$ and $t_4$ of the FG edges FG0 in the adjacent motor revolutions correspond to the same rotation angle, the period TP_0 between two edges corresponding to the same rotation angle is representative of an actual rotation period of a completely motor revolution. Similarly, the period TP_1 between two edges corresponding to the same rotation angle is representative of an actual rotation period of a completely motor revolution, and the period TP_2 between two edges corresponding to the same rotation angle is representative of an actual rotation period of a completely motor revolution. The adjusting circuit 412 shown in FIG. 20 uses this feature to detect the rotation error.

In this embodiment, the adjusting circuit 412 includes a rotation error detector 902 and a compensator 904. The rotation error detector 902 comprises an initialization controller 906, a plurality of frequency dividers 908, 910, 912, an OR gate 914, and a phase detector 916. The frequency dividers 908, 910, 912 are used for dividing a reference clock $CLK_{ref}$ to generate reference signals FG0_REF, FG1_REF, FG2_REF each having a period T_IRP equal to an ideal rotation period of the motor revolution, respectively. Additionally, the initialization controller 906 is operative to align edges of the reference signals FG0_REF, FG1_REF, FG2_REF to the FG edges FG0, FG1, FG2 respectively before the reference signals FG0_REF, FG1_REF, FG2_REF are used for rotation error detection. Referring to FIG. 21, when triggered by the FG edge FG0 at $t_1$, the initialization controller 906 resets the frequency divider 908 so that the generated reference signal FG0_REF is aligned to the FG edge FG0 at $t_1$. Similarly, when triggered by the FG edge FG1 at $t_2$, the initialization controller 906 resets the frequency divider 910 so that the generated reference signal FG1_REF is aligned to the FG edge FG1 at $t_2$, and when triggered by the FG edge FG2 at $t_3$, the initialization controller 906 resets the frequency divider 912 so that the generated reference signal FG2_REF is aligned to the FG edge FG2 at $t_3$.

As shown in FIG. 21, a phase error $P_1$ exists between $t_4$ and $t_4$' because the actual period of the motor revolution, TP_0, is shorter than the ideal rotation period T_IRP defined by the generated reference signal FG0_REF. In other words, according to the circuit configuration shown in FIG. 20, the rotation error is detected according to a reference edge of the FG signal FG_A of a reference revolution corresponding to a rotation angle (e.g., the edge of the FG signal FG_A at $t_1$) and an operating edge of the FG signal FG_A of an operating revolution corresponding to the same rotation angle (e.g., the edge of the FG signal FG_A at $t_4$). Similarly, a phase error $P_2$ exists between $t_5$ and $t_5$' because the actual period of the motor revolution, TP_1, is shorter than the ideal rotation period T_IRP defined by the generated reference signal FG1_REF, and a phase error $P_3$ exists between $t_6$ and $t_6$' because the actual period of the motor revolution, TP_2, is shorter than the ideal rotation period T_IRP defined by the generated reference signal FG2_REF.

In this embodiment, the OR gate 914 is implemented to perform an OR operation upon the reference signals FG0_REF, FG1_REF, FG2_REF for outputting a resultant reference signal FG_REF as shown in FIG. 21. In this way, the phase detector 916 is capable of detecting the above-mentioned phase errors $P_1$, $P_2$, $P_3$ with the help of the resultant reference signal FG_REF. Next, the compensator 904 refers to the measured rotation errors (i.e., the phase errors $P_1$, $P_2$, $P_3$) from the phase detector 916 to generate a compensating signal $S_c$ to the driving signal generator 428 for activating the driving signal compensation, to the draw data generator 426 for activating the draw data compensation, or to the draw clock generator 424 for activating the draw clock compensation. Since the operations of the driving signal compensation, the draw data compensation, and the draw clock compensation have been detailed described above, further description is omitted here for the sake of brevity. As one can see, if there are three FG edges per motor revolution, the driving signal is allowed to be adjusted three times per motor revolution when rotation errors associated with respective FG edges are detected due to the disclosed one-to-one detection scheme. In this way, the image quality of the visible image printed (recorded) on the optical disc 401 is greatly improved.

Figure 22:
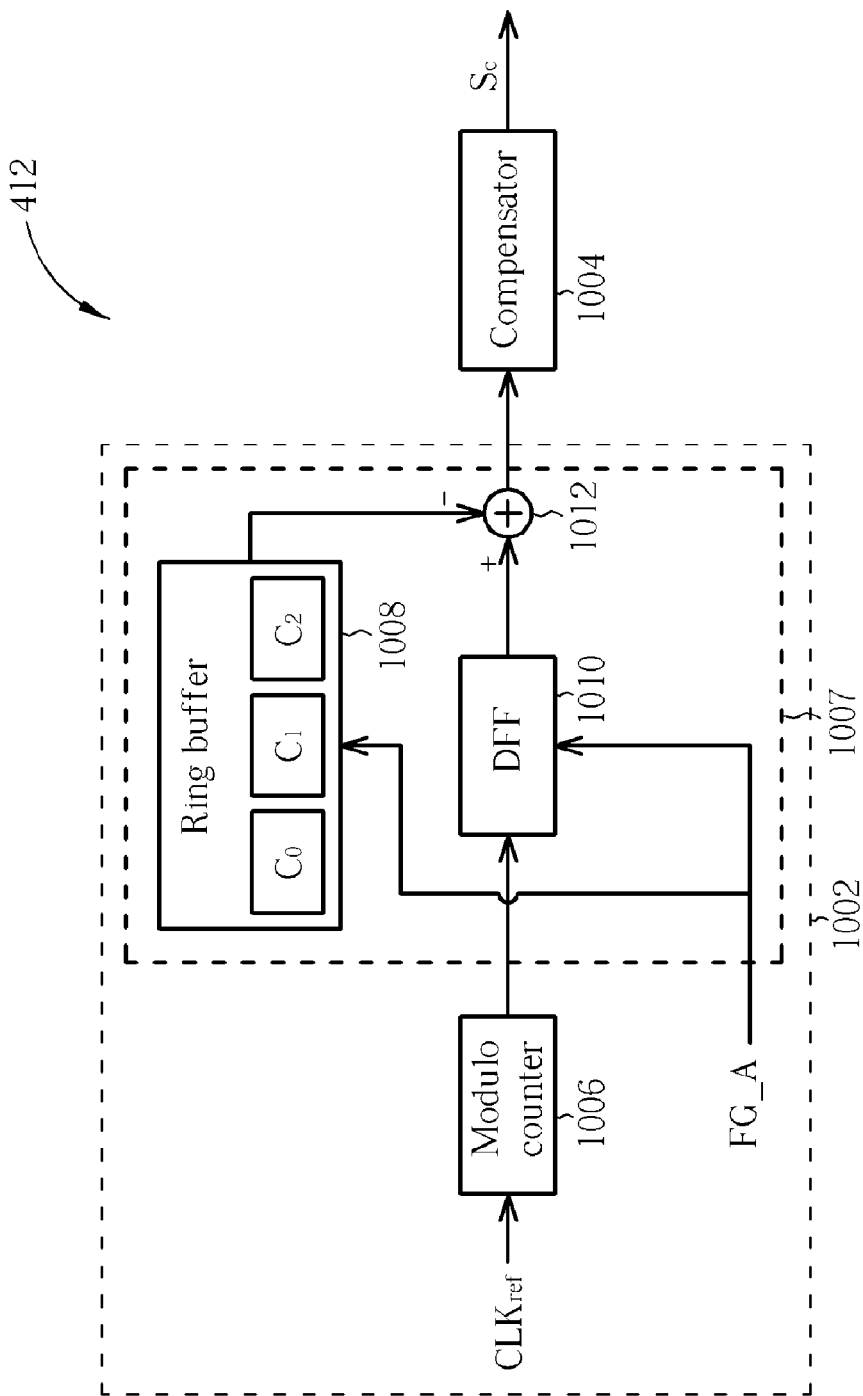
FIG. 22 is a diagram illustrating another alternative design of the adjusting circuit shown in FIG. 10 that adopts a second one-to-one detection scheme.

Please refer to FIG. 22. FIG. 22 is a diagram illustrating another alternative design of the adjusting circuit 412 shown in FIG. 10 that adopts a second one-to-one detection scheme. In a real application, the number of FG edges per motor revolution, for example, is 36, which increases the cost of implementing the adjusting circuit shown in FIG. 20 because many frequency dividers are needed for generating the desired reference signals for the FG edges corresponding to different rotation angles. Due to the fact that the FG edges occur sequentially and periodically, the invention discloses a second one-to-one detection scheme to use a rotation counter and a ring buffer instead, thereby reducing the production cost. In this embodiment, the adjusting circuit 412 comprises a rotation error detector 1002 and a compensator 1004. The rotation error detector 1002 includes a rotation counter implemented by a modulo counter 1006 and a comparing unit 1007 having a ring buffer 1008, a switch device implemented by a D flip-flop (DFF) 1010, and a comparator 1012.

Please refer to FIG. 21 and FIG. 22. For simplicity, suppose that each motor revolution of the spindle motor 404 will make the FG signal FG_A has three FG edges FG0, FG1, and FG2 as shown in FIG. 21. The modulo counter 1006 is defined to cyclically count an ideal rotation period T_IRP of the motor revolution according to clock cycles of the reference clock $CLK_{ref}$. For example, the ideal rotation period T_IRP corresponds to 300 clock cycles of the reference clock $CLK_{ref}$. Therefore, the modulo counter 1006 counts from a counter value equal to 0 to another counter value equal to 299, cyclically. In addition, the modulo counter 1006 is further configured to output three counter values serving as reference counter values $C_0$, $C_1$, $C_2$ for detecting rotation errors associated with the FG edges FG0, FG1, FG2 respectively. For example, the modulo counter 1006 has a counter value equal to 50 at the time when the FG edge FG0 in one motor revolution occurs at $t_1$. Therefore, the modulo counter 1006 outputs the current counter value to the ring buffer 1008 to be the reference counter value $C_0$. As a result, the reference counter $C_0$ equal to 50 is buffered in the ring buffer 1008 at $t_1$. Later, the modulo counter 1006 has a counter value equal to 140 at the time when the FG edge FG1 in one motor revolution occurs at $t_2$. Therefore, the modulo counter 1006 outputs the current counter value to the ring buffer 1008 to be the reference counter value $C_1$. As a result, the reference counter $C_1$ equal to 140 is buffered in the ring buffer 1008 at $t_2$. Next, the modulo counter 1006 has a counter value equal to 260 at the time when the FG edge FG2 in the same motor revolution occurs at $t_3$. Therefore, the modulo counter 1006 outputs the current counter value to the ring buffer 1008 to be the reference counter value $C_2$. As a result, the reference counter $C_2$ equal to 260 is buffered in the ring buffer 1008 at $t_3$.

After the reference counters $C_0$, $C_1$, $C_2$ are properly set, the rotation error detection 1002 is allowed to be started. As shown in FIG. 21, the FG edge FG0 in a next motor revolution occurs at $t_4$. Therefore, the DFF 1010 is trigged to output a current operating counter value determined by the modulo counter 1006 to the comparator 1012. At the same time, the ring buffer 1008 is also triggered by the FG edge FG0 at $t_4$ to output the buffered reference counter value $C_0$ to the comparator 1012. It should be noted that the reference counter value $C_0$ is the first reference counter value to be outputted since it is the first reference counter value stored into the ring buffer 1008. As mentioned above, the modulo counter 1006 is implemented to count the ideal rotation period T_IRP. Therefore, if the actual rotation period TP_0 is equal to the ideal rotation period T_IRP, the operating counter value at $t_4$ should be exactly equal to the reference counter value $C_0$, i.e., 50. However, as shown in FIG. 21, the actual rotation period TP_0 is shorter than the ideal rotation period T_IRP, meaning that the operating counter value delivered to the comparator 1012 for comparison is less than the reference counter value $C_0$. In this way, after comparing the output from the ring buffer 1008 and the output from the DFF 1010, the comparator 1012 detects a difference between the reference counter value $C_0$ and the operating counter value counted at $t_4$. Next, the compensator 1004 determines a compensating signal $S_c$ according to the detection result from the comparator 1012, and then outputs the compensating signal $S_c$ to the driving signal generator 428 for activating the driving signal compensation, to the draw data generator 426 for activating the draw data compensation, or to the draw clock generator 424 for activating the draw clock compensation. Please note that since the operations of the driving signal compensation, the draw data compensation, and the draw clock compensation have been detailed above, further description is omitted here for the sake of brevity.

Next, the FG edge FG1 in the motor revolution occurs at $t_5$. Therefore, the DFF 1010 is trigged to output a current operating counter value determined by the modulo counter 1006 to the comparator 1012. At the same time, the ring buffer 1008 is also triggered at $t_5$ to output the buffered reference counter value $C_1$ to the comparator 1012. As one can see, the actual rotation period TP_1 is shorter than the ideal rotation period T_IRP, meaning that the operating counter value delivered to the comparator 1012 for comparison is less than the reference counter value $C_1$, i.e., 140. In this way, after comparing the output from the ring buffer 1008 and the output from the DFF 1010, the comparator 1012 detects a difference between the reference counter value $C_1$ and the counter value counted at $t_5$. Next, the compensator 1004 determines a compensating signal $S_c$ according to the detection result from the comparator 1012, and then outputs the compensating signal $S_c$ to the driving signal generator 428, to the draw data generator 426, or to the draw clock generator 424.

Later, the FG edge FG2 in the same motor revolution occurs at $t_6$. Therefore, the DFF 1010 is trigged to output a current operating counter value determined by the modulo counter 1006 to the comparator 1012. At the same time, the ring buffer 1008 is also triggered at $t_6$ to output the buffered reference counter value $C_2$ to the comparator 1012. As one can see, the actual rotation period TP_2 is shorter than the ideal rotation period T_IRP, meaning that the operating counter value delivered to the comparator 1012 for comparison is less than the reference counter value $C_2$, i.e., 260. In this way, after comparing the output from the ring buffer 1008 and the output from the DFF 1010, the comparator 1012 detects a difference between the reference counter value $C_2$ and the counter value counted at $t_6$. Next, the compensator 1004 determines a compensating signal $S_c$ according to the detection result from the comparator 1012, and then outputs the compensating signal $S_c$ to the driving signal generator 428, to the draw data generator 426, or to the draw clock generator 424.

The above operation is repeated to detect following rotation errors. For example, the FG edge FG0 in a following motor revolution occurs at $t_7$. Therefore, the DFF 1010 is trigged to output a current operating counter value determined by the modulo counter 1006 to the comparator 1012, and the ring buffer 1008 is triggered to output the buffered reference counter value $C_0$ again due to the characteristics of the ring buffer 1008.

Because the frequency of the FG signal FG_A is not very high, it is possible to realize the above-mentioned one-to-one detection schemes by software implementations. For example, a processor, such as a DSP, is configured to run program execution codes specified for performing the disclosed one-to-one detection scheme. This also obeys the spirit of the invention.

Figure 23:
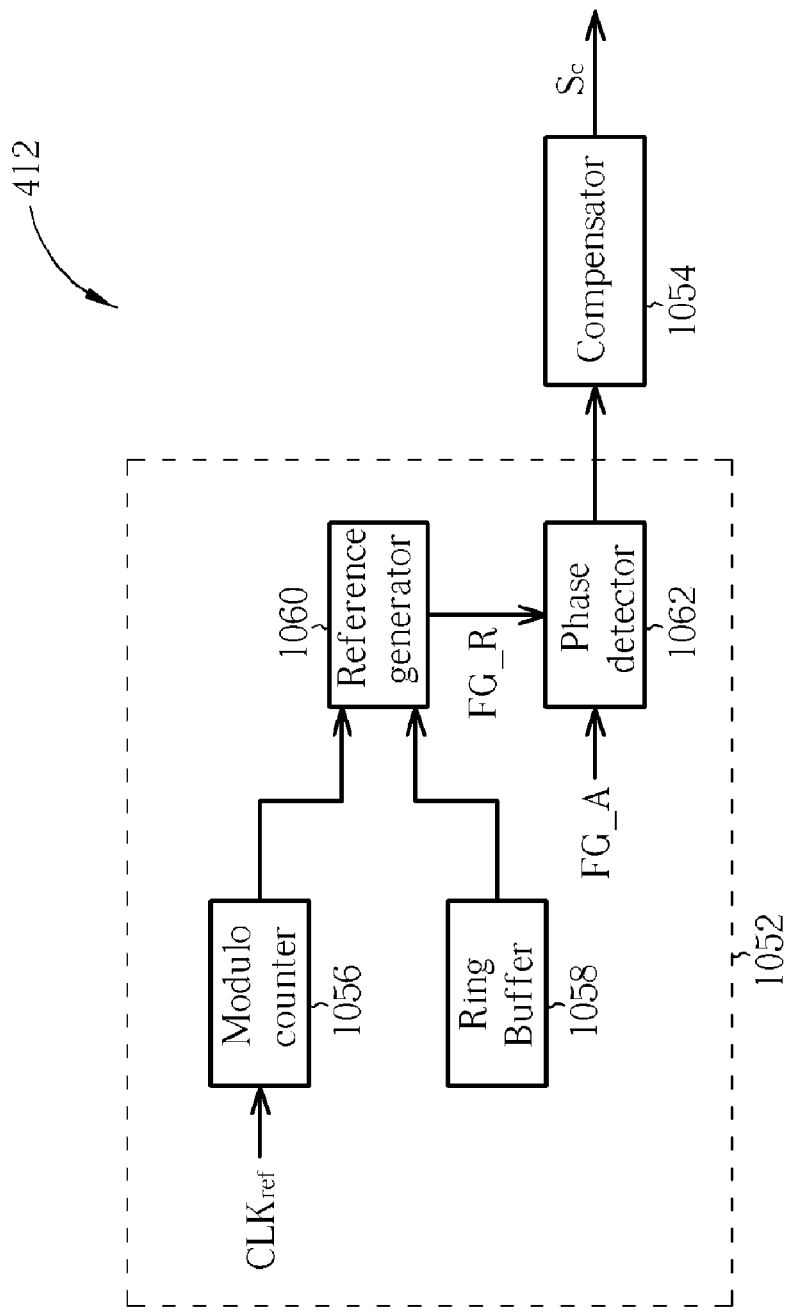
FIG. 23 is a diagram illustrating yet another alternative design of the adjusting circuit shown in FIG. 10.

FIG. 23 is a diagram illustrating yet another alternative design of the adjusting circuit 412 shown in FIG. 10. In this embodiment, the adjusting circuit 412 has a rotation error detector 1052 and a compensator 1054. The rotation error detector 1052 includes a modulo counter 1056, a ring buffer 1058, a reference generator 1060, and a phase detector 1062. The operations and functions of the modulo counter 1056 and the ring buffer 1058 are identical to that of the modulo counter 1006 and the ring buffer 1008 shown in FIG. 22. In this embodiment, when a counter value outputted from the modulo counter 1056 is equal to a reference counter value stored in the ring buffer 1058, the reference generator 1060 generates a reference signal FG_R to the phase detector 1062. Next, the phase detector 1062 detects a phase error between the reference signal FG_R and the FG signal FG_A to generate a detection result of the rotation error. In the end, the compensator 1054 determines a compensating signal $S_c$ according to the detection result given by the preceding phase detector 1062.

In addition to above one-to-one detection schemes, a person skilled this art can readily understand that other one-to-one detection schemes are possible after reading above disclosure. Some exemplary embodiments are given as below. Regarding one exemplary embodiment, the rotation error detector 902, 1002 or 1052 is modified to output the detection result by detecting a phase error between a reference edge of the FG signal corresponding to a specific rotation angle in a reference motor revolution and an operating edge of the FG signal corresponding to the specific rotation angle in an operating motor revolution. For clarity, suppose that the symbol $FG\_EDGE_K[N]$ denotes the $K^{th}$ FG edge in the $N^{th}$ motor revolution. Therefore, this exemplary embodiment is defined to detect the rotation error (i.e., the phase error) by comparing the phase of the reference edge $FG\_EDGE_K[N_{ref}]$ and the phase of the operation edge $FG\_EDGE_K[N_{opr}]$, where the integer $N_{opr}$ is larger than the integer $N_{ref}$. In short, in this exemplary embodiment, the rotation error is determined according to a phase relation between the reference edge to the operating edge.

Regarding another exemplary embodiment, the rotation error detector 902, 1002 or 1052 is modified to output the detection result by detecting a phase error between a reference edge of the FG signal corresponding to a specific rotation angle in a reference motor revolution and an operating edge of a reference signal corresponding to the specific rotation angle in an operating motor revolution. Therefore, this exemplary embodiment is defined to detect the rotation error (i.e., the phase error) by comparing phase of the reference edge $FG\_EDGE_K[N_{ref}]$ and phase of the reference signal with the ideal rotation period T_IRP.

Regarding another exemplary embodiment, the rotation error detector 902, 1002 or 1052 is modified to detect a specific period from a reference edge of the FG signal corresponding to a specific rotation angle in a reference motor revolution to an operating edge of the FG signal corresponding to the specific rotation angle in an operating motor revolution and then determines a period error between the specific period and a reference period to generate the detection result. In other words, this exemplary embodiment is defined to detect the rotation error (i.e., the period error) by comparing a period from the reference edge $FG\_EDGE_K[N_{ref}]$ to the operation edge $FG\_EDGE_K[N_{opr}]$ with the value of ideal rotation period T_IRP times $(N_{opr}-N_{ref})$, where the integer $N_{opr}$ is larger than the integer $N_{ref}$. In short, in this exemplary embodiment, the rotation error is determined according to a period from the reference edge to the operating edge.

Regarding yet another exemplary embodiment, the rotation error detector 902, 1002 or 1052 is modified to detect a first period from a first reference edge of the FG signal corresponding to a specific rotation angle in a first reference motor revolution to a first operating edge of the FG signal corresponding to the specific rotation angle in a first operating motor revolution, detect a second period from a second reference edge of the FG signal corresponding to the specific rotation angle in a second reference motor revolution and a second operating edge of the FG signal corresponding to the specific rotation angle in a second operating motor revolution, and then determine a period error between the first period and the second period to generate the detection result. Preferably, the first operating motor revolution and the second reference motor revolution are equivalent; however, this is for illustrative purposes only, and not meant to be limitations. In other words, this exemplary embodiment can be defined to detect the rotation error (i.e., the period error) by comparing one period from $FG\_EDGE_K[N-1]$ to $FG\_EDGE_K[N]$ with another period from $FG\_EDGE_K[N-2]$ to $FG\_EDGE_K[N-1]$.

Figure 24:
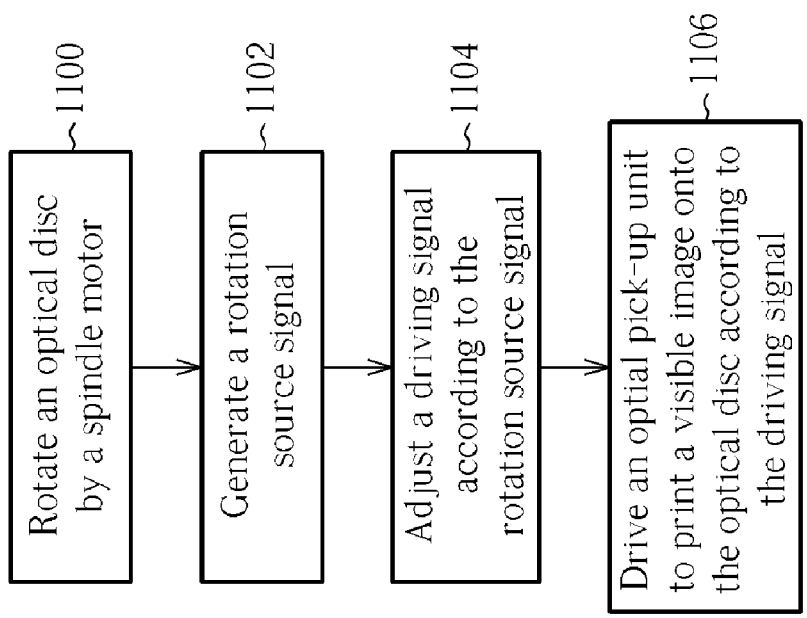
FIG. 24 is a generalized method of improving the quality of the visible image printed on an optical disc according to an embodiment of the invention.

Please refer to FIG. 24. FIG. 24 is a generalized method of improving the quality of the visible image printed on an optical disc according to an embodiment of the invention. The method is performed by the optical disc recording system 400 shown in FIG. 10, and includes following steps.

Step 1100: Rotate an optical disc by a spindle motor;
Step 1102: Generate a rotation source signal indicating a rotation status of the spindle motor;
Step 1104: Provide a driving signal and adjust the driving signal according to the rotation source signal; and
Step 1006: Drive an optical pick-up unit to print a visible image onto the optical disc according to the driving signal.

In step 1102, the rotation source signal could be generated by detecting rotation marks disposed on the optical disc or disposed on a hub of the spindle motor. In other embodiments, the rotation source signal could be a wobble signal or an FG signal. In step 1104, adjusting the driving signal could be achieved by adopting the aforementioned driving signal compensation, the aforementioned draw data compensation, the aforementioned draw clock compensation, or any possible combinations thereof.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A system for driving an optical pick-up unit to form a visible image onto an optical disc, the optical disc being rotated by a spindle motor, the system comprising:
    a driving circuit, coupled to the optical pick-up unit, for providing a driving signal to drive the optical pick-up unit; and
    an adjusting circuit, coupled to the driving circuit, for generating a compensation signal according to a rotation source signal corresponding to a rotation of the optical disc;
    wherein the driving circuit comprises:
    a draw clock generator, for generating a draw clock and controlling at least one period of the draw clock according to the compensation signal;
    a draw data generator, coupled to the draw clock generator, for generating a draw data according to the draw clock; and
    a driving signal generator, coupled to the draw data generator, for converting the draw data into the driving signal.

2. The system of claim 1, wherein the adjusting circuit generates the compensation signal according to an error of a rotation position detected from the rotation source signal.

3. The system of claim 1, wherein the adjusting circuit generates the compensation signal according to a period of the rotation source signal.

4. The system of claim 3, wherein the adjusting circuit generates the compensation signal according to a relation between the period of the rotation source signal and a reference period.

5. The system of claim 1, wherein the adjusting circuit generates the compensation signal according to a phase difference between the rotation source signal and a reference signal.

6. A system for driving an optical pick-up unit to form a visible image onto an optical disc, the optical disc being rotated by a spindle motor, the system comprising:
    a driving circuit, coupled to the optical pick-up unit, for providing a driving signal to drive the optical pick-up unit; and
    an adjusting circuit, coupled to the driving circuit, for generating a compensation signal according to a rotation source signal corresponding to a rotation of the optical disc;
    wherein the driving circuit comprises:
    a draw clock generator, for generating a draw clock;
    a draw data generator, coupled to the draw clock generator, for generating a draw data according to the draw clock and controlling a duration of the draw data according to the compensation signal; and
    a driving signal generator, coupled to the draw data generator, for converting the draw data into the driving signal.

7. A system for driving an optical pick-up unit to form a visible image onto an optical disc, the optical disc being rotated by a spindle motor, the system comprising:
    a driving circuit, coupled to the optical pick-up unit, for providing a driving signal to drive the optical pick-up unit; and
    an adjusting circuit, coupled to the driving circuit, for generating a compensation signal according to a rotation source signal corresponding to a rotation of the optical disc;

wherein the driving circuit comprises:
a draw clock generator, for generating a draw clock;
a draw data generator, coupled to the draw clock generator, for generating a draw data according to the draw clock and controlling a data amount of the draw data according to the compensation signal; and
a driving signal generator, coupled to the draw data generator, for converting the draw data into the driving signal.

8. A system for driving an optical pick-up unit to form a visible image onto an optical disc the optical disc being rotated by a spindle motor, the system comprising:
a driving circuit, coupled to the optical pick-up unit, for providing a driving signal to drive the optical pick-up unit; and
an adjusting circuit, coupled to the driving circuit, for generating a compensation signal according to a rotation source signal corresponding to a rotation of the optical disc;
wherein the driving circuit comprises:
a draw clock generator, for generating a draw clock;
a draw data generator, coupled to the draw clock generator, for generating a draw data according to the draw clock; and
a driving signal generator, coupled to the draw data generator, for converting the draw data into the driving signal and controlling the driving signal according to the compensation signal.

9. The system of claim 8, wherein the driving signal comprises a plurality of pulses, and the driving signal generator adjusts the magnitude of the pulses according to the compensation signal generated from the adjusting circuit.

10. The system of claim 8, wherein the driving signal comprises a plurality of pulses, and the driving signal generator adjusts the duty ratio of the pulses according to the compensation signal generated from the adjusting circuit.

11. A system for driving an optical pick-up unit to form a visible image onto an optical disc the optical disc being rotated by a spindle motor, the system comprising:
a driving circuit, coupled to the optical pick-up unit, for providing a driving signal to drive the optical pick-up unit; and
an adjusting circuit, coupled to the driving circuit, for controlling the driving circuit to adjust the driving according to a rotation source signal corresponding to a rotation of the optical disc and;
wherein the driving circuit adjusts the driving signal according to a rotation error detected from the rotation source signal.

12. The system of claim 11, wherein the rotation source signal is a frequency generator (FG) signal generated from sensing the rotation of the spindle motor, the FG signal comprises a plurality of edges per motor revolution, and the rotation error is detected according to at least a first reference edge of the FG signal of a first reference revolution corresponding to a first rotation angle and a first operating edge of the FG signal of an operating revolution corresponding to the first rotation angle.

13. The system of claim 12, wherein the rotation error is detected according to a period from the first reference edge to the first operating edge.

14. The system of claim 12, wherein the rotation error is detected according to a phase relation between the first reference edge to the first operating edge.

15. The system of claim 12, wherein the rotation error is further detected according to a second reference edge of a second reference revolution corresponding to a second rotation angle and a second operating edge of the operating revolution corresponding to the second rotation angle.

16. The system of claim 12, wherein the adjusting circuit comprises:
a counter, for cyclically counting to generate an operating counter value corresponding to the first operating edge; and
a storage device, for storing a reference counter value corresponding to the first reference edge;
wherein the adjusting circuit generates the rotation error according to a difference between the operating counter value and the reference counter value stored in the storage device.

17. The system of claim 12, wherein the rotation error detector comprises:
a counter, for cyclically counting to provide a counter value;
a storage device, for storing a reference counter value of the counter corresponding to the first reference edge; and
a reference generator, for generating a reference signal according to the counter value of the counter and the reference counter value stored in the storage device; and
a phase detector, coupled to the reference generator, for detecting a phase error between the reference signal and the first operating edge to generate the rotation error.

18. A method for driving an optical pick-up unit to form a visible image onto an optical disc, the optical disc being rotated by a spindle motor, the method comprising:
generating a compensation signal according to a rotation source signal corresponding to a rotation of the optical disc;
generating a draw clock and controlling at least one period of the draw clock according to the compensation signal;
generating a draw data according to the draw clock; and
converting the draw data into a driving signal so as to drive the optical pick-up unit to form the visible image onto the optical disc.

19. The method of claim 18, wherein the step of generating the compensation signal comprises generating the compensation signal according to an error of a rotation position detected from the rotation source signal.

20. The method of claim 18, wherein the step of generating the compensation signal comprises generating the compensation signal according to a period of the rotation source signal.

21. The method of claim 20, wherein the step of generating the compensation signal comprises generating the compensation signal according to a relation between the period of the rotation source signal and a reference period.

22. The method of claim 18, wherein the step of generating the compensation signal comprises generating the compensation signal according to a phase of the rotation source signal.

23. A method for driving an optical pick-up unit to form a visible image onto an optical disc, the optical disc being rotated by a spindle motor, the method comprising:
generating a compensation signal according to a rotation source signal corresponding to a rotation of the optical disc;
generating a draw clock;
generating a draw data according to the draw clock and controlling a duration of the draw data according to the compensation signal; and
converting the draw data into a driving signal so as to drive the optical pick-up unit to form the visible image onto the optical disc.

24. A method for driving an optical pick-up unit to form a visible image onto an optical disc, the optical disc being rotated by a spindle motor, the method comprising:
generating a compensation signal according to a rotation source signal corresponding to a rotation of the optical disc;

generating a draw clock;
generating a draw data according to the draw clock and controlling a data amount of the draw data according to the compensation signal; and
converting the draw data into a driving signal so as to drive the optical pick-up unit to form the visible image onto the optical disc.

25. A method for driving an optical pick-up unit to form a visible image onto an optical disc, the optical disc being rotated by a spindle motor, the method comprising:
generating a compensation signal according to a rotation source signal corresponding to a rotation of the optical disc;
generating a draw clock;
generating a draw data according to the draw clock; and
converting the draw data into a driving signal so as to drive the optical pick-up unit to form the visible image onto the optical disc;
wherein the step of converting the draw data into the driving signal comprises controlling the driving signal according to the compensation signal.

26. The method of claim 25, wherein the driving signal comprises a plurality of pulses, and the step of converting the draw data into the driving signal comprises adjusting the magnitude of the pulses according to the compensation signal.

27. The method of claim 25, wherein the driving signal comprises a plurality of pulses, and the step of converting the draw data into the driving signal comprises adjusting the duty ratio of the pulses according to the compensation signal.

28. The method of claim 25, wherein the step of generating the compensation signal comprises generating the compensation signal according to a phase difference between the rotation source signal and a reference signal.

29. The method of claim 28, wherein the step of generating the compensation signal further comprises generating the reference signal by dividing the draw clock.

30. The method of claim 28, wherein the step of generating the compensation signal further comprises generating the reference signal according to the draw data.

31. A method for driving an optical pick-up unit to form a visible image onto an optical disc the optical disc being rotated by a spindle motor, the method comprising:
providing a driving signal to drive the optical pick-up unit; and
adjusting the driving signal according to a rotation source signal corresponding to a rotation of the optical disc;
wherein the step of adjusting the driving signal comprises adjusting the driving signal according to a rotation error detected from the rotation source signal.

32. The method of claim 31, wherein the step of adjusting the driving signal further comprises:
utilizing a frequency generator (FG) signal generated from sensing the rotation of the spindle motor as the rotation source signal, where the FG signal comprises a plurality of edges per motor revolution; and
detecting the rotation error according to at least a first reference edge of the FG signal of a first reference revolution corresponding to a first rotation angle and a first operating edge of the FG signal of an operating revolution corresponding to the first rotation angle.

33. The method of claim 32, wherein the step of detecting the rotation error comprises detecting the rotation error according to a period from the first reference edge to the first operating edge.

34. The method of claim 32, wherein the step of detecting the rotation error according to the period from the first reference edge to the first operating edge comprises detecting the rotation error according to a phase relation between the first reference edge to the first operating edge.

35. The method of claim 32, wherein the step of detecting the rotation error further comprises detecting the rotation error according to a second reference edge of a second reference revolution corresponding to a second rotation angle and a second operating edge of the operating revolution corresponding to the second rotation angle.

36. The method of claim 35, wherein the first reference revolution and the second reference revolution are equivalent.

37. The method of claim 32, wherein the step of detecting the rotation error comprises:
cyclically counting to generate an operating counter value corresponding to the first operating edge;
storing a reference counter value corresponding to the first reference edge; and
determining the rotation error according to a difference between the operating counter value and the stored reference counter value.

38. The method of claim 31, wherein the step of adjusting the driving signal comprises:
utilizing a frequency generator (FG) signal generated from sensing the rotation of the spindle motor as the rotation source signal, where the FG signal comprises a plurality of edges per motor revolution; and
detecting the rotation error according to a relation between a first operating edge of the FG signal of an operating revolution corresponding to a first rotation angle and a first reference phase corresponding to the first rotation angle.

39. The method of claim 32, wherein the step of detecting the rotation error comprises:
dividing a reference clock signal to generate a reference signal with a phase corresponding to the first reference edge; and
detecting a phase error between the reference signal and the rotation source signal to generate the rotation error.

40. The method of claim 32, wherein the step of detecting the rotation error comprises:
cyclically counting to provide a counter value;
storing a reference counter value of the counter corresponding to the first reference edge; and
generating a reference signal according to the counter value of the counter and the stored reference counter value; and
detecting a phase error between the reference signal and the first operating edge to generate the rotation error.

* * * * *